March 31, 1970 C. W. MODERSOHN ET AL 3,503,847
PULP MOLDING MACHINE
Filed April 9, 1965 19 Sheets-Sheet
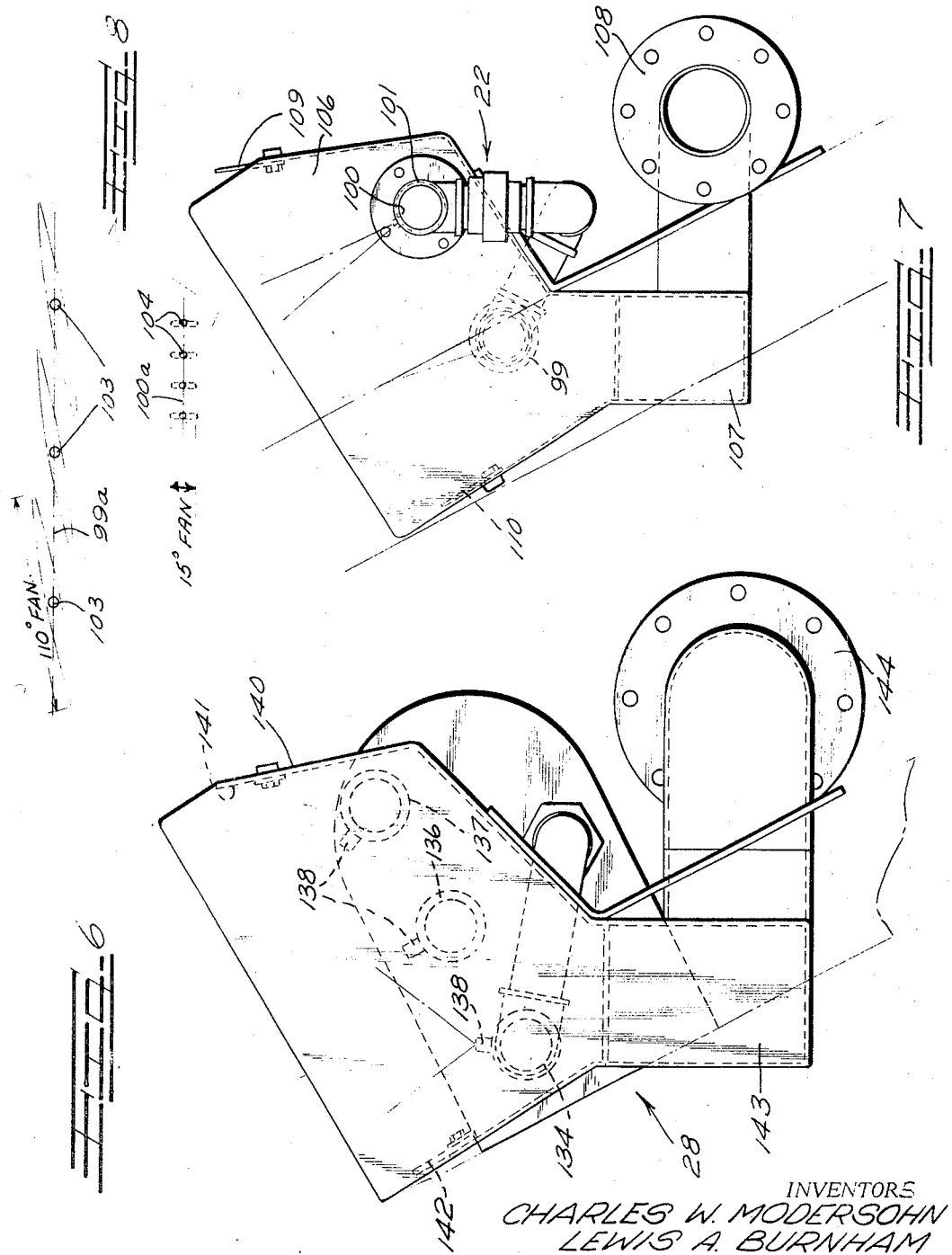
INVENTORS
CHARLES W. MODERSOHN
LEWIS A. BURNHAM
JOSEPH MELTER
JOHN D. CRAIN
ATTORNEYS

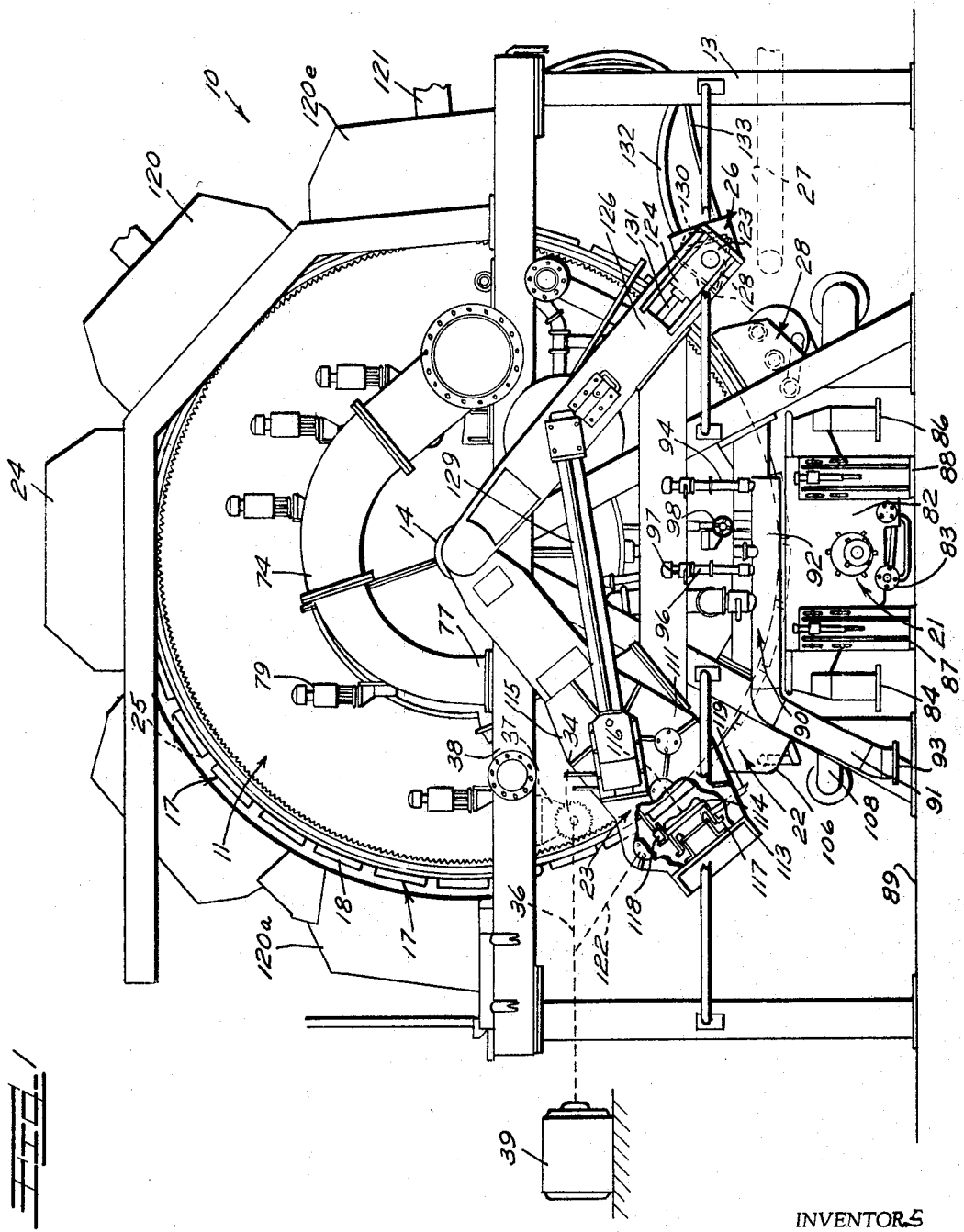

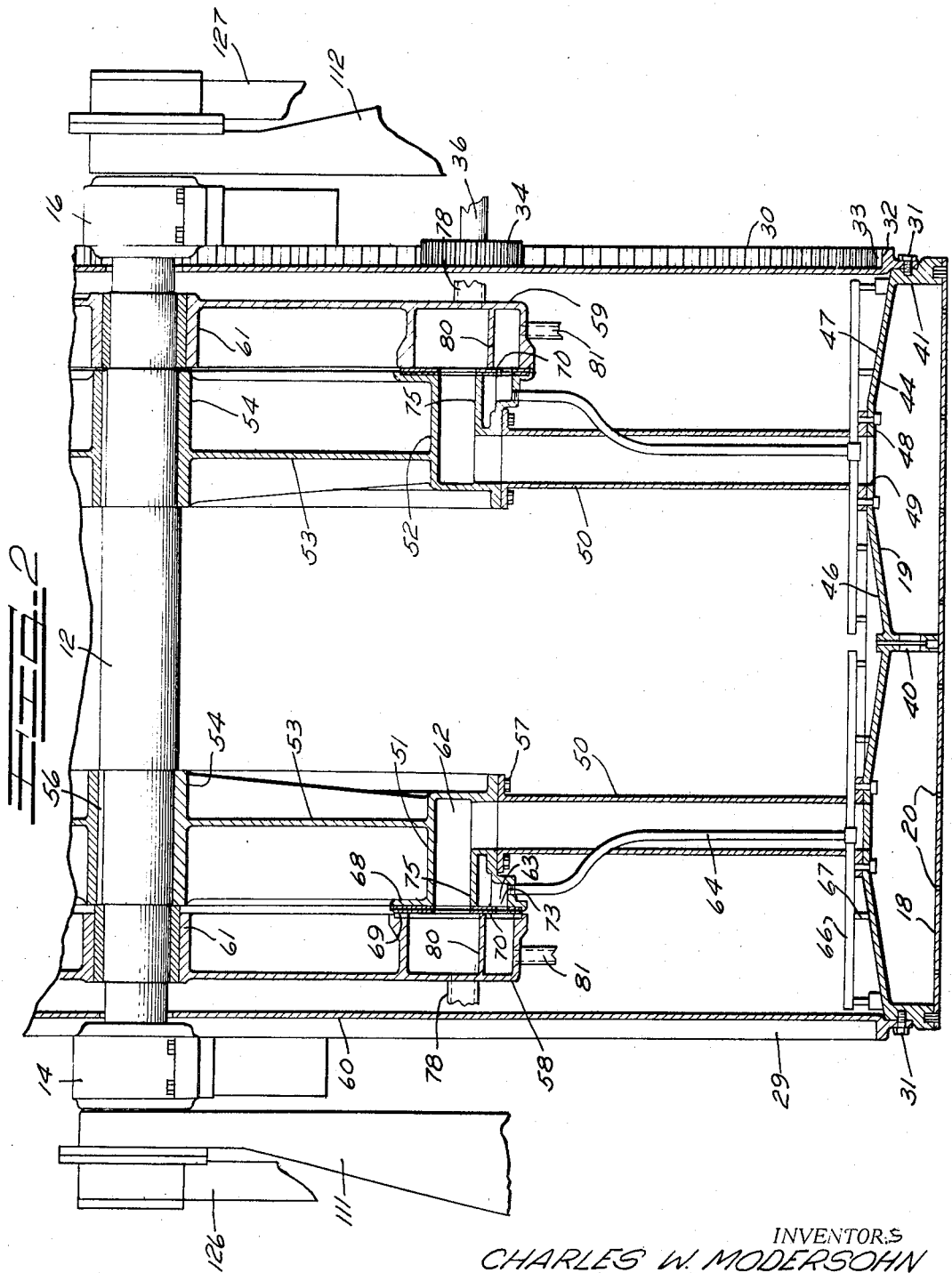

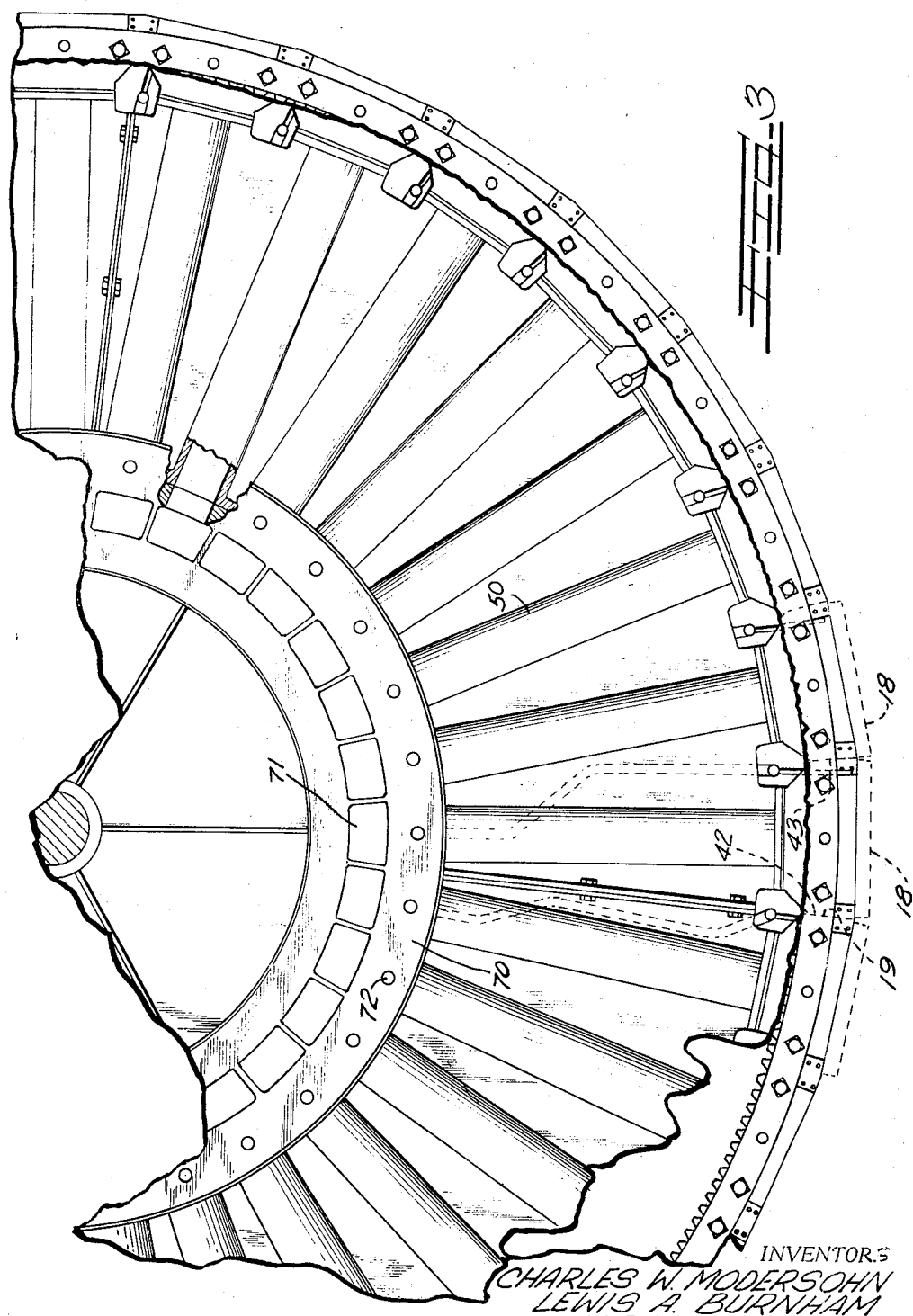

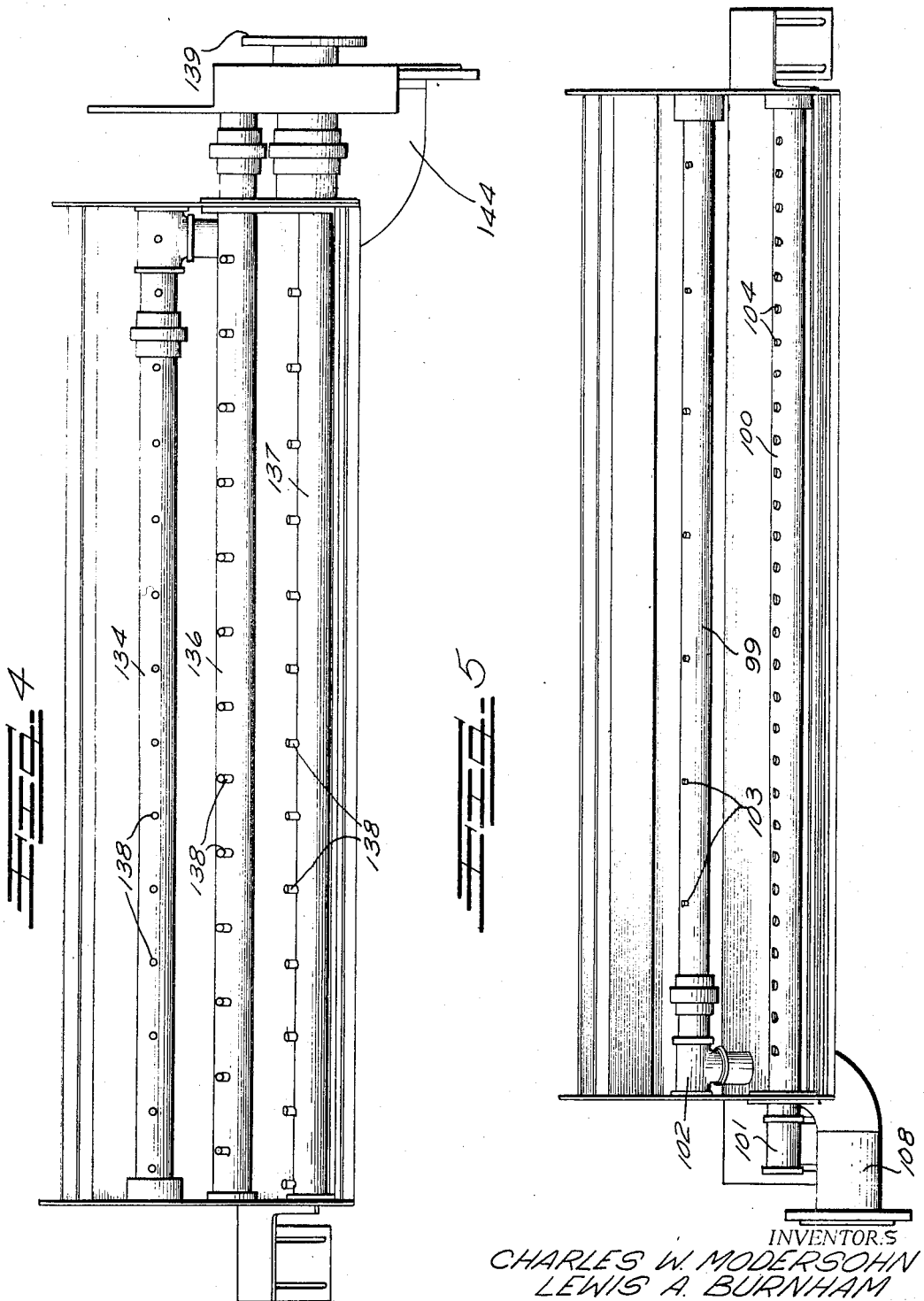

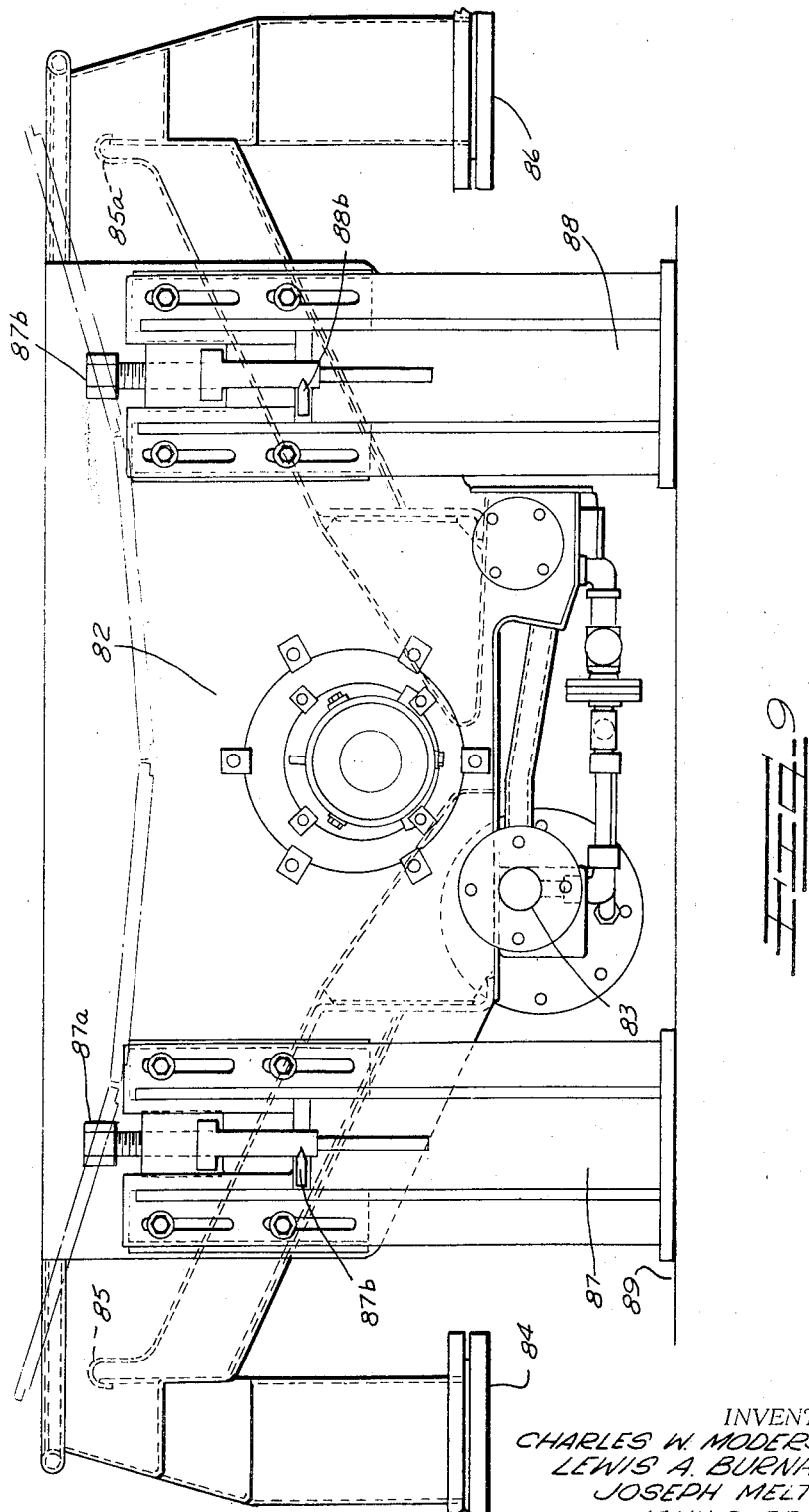

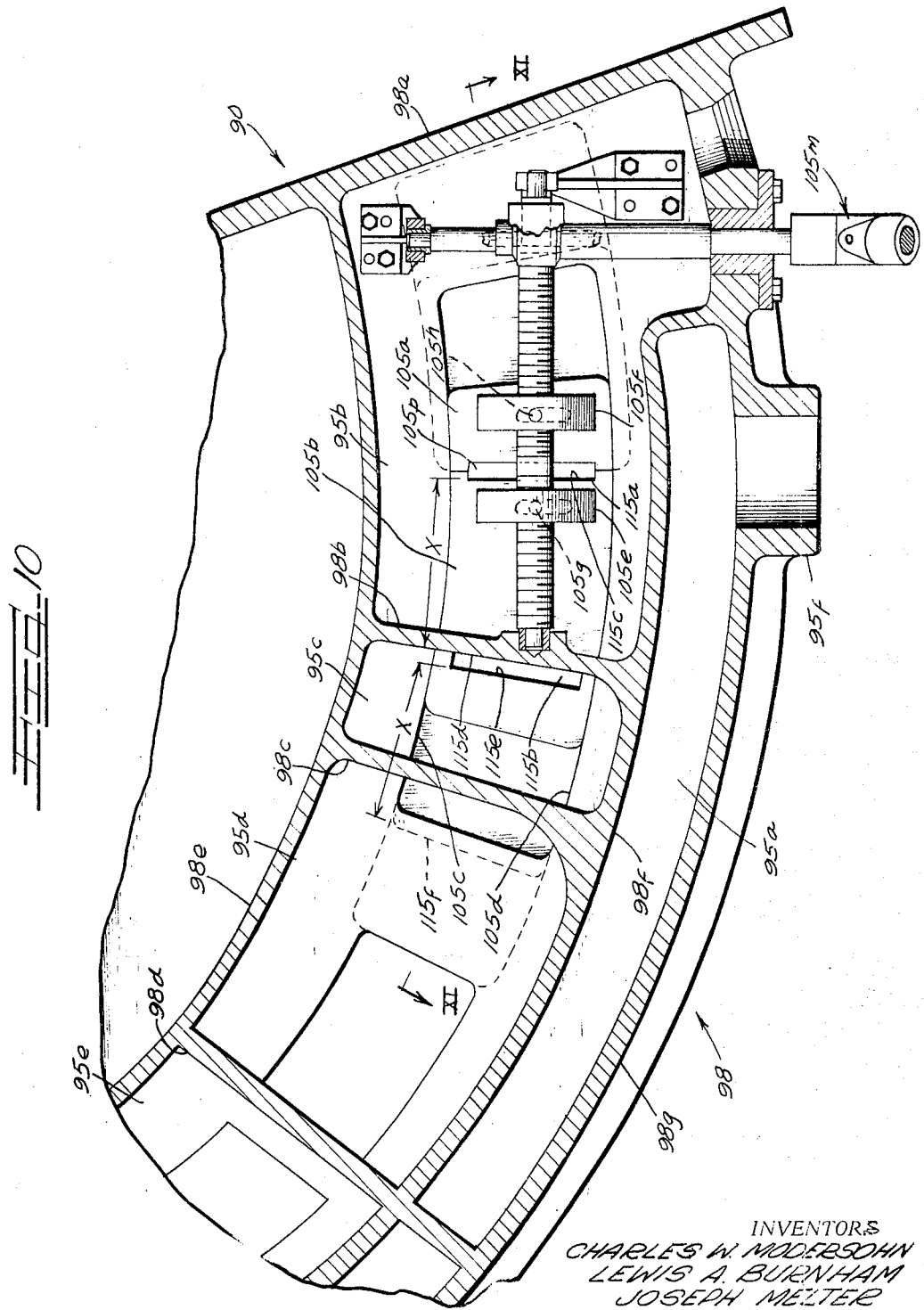

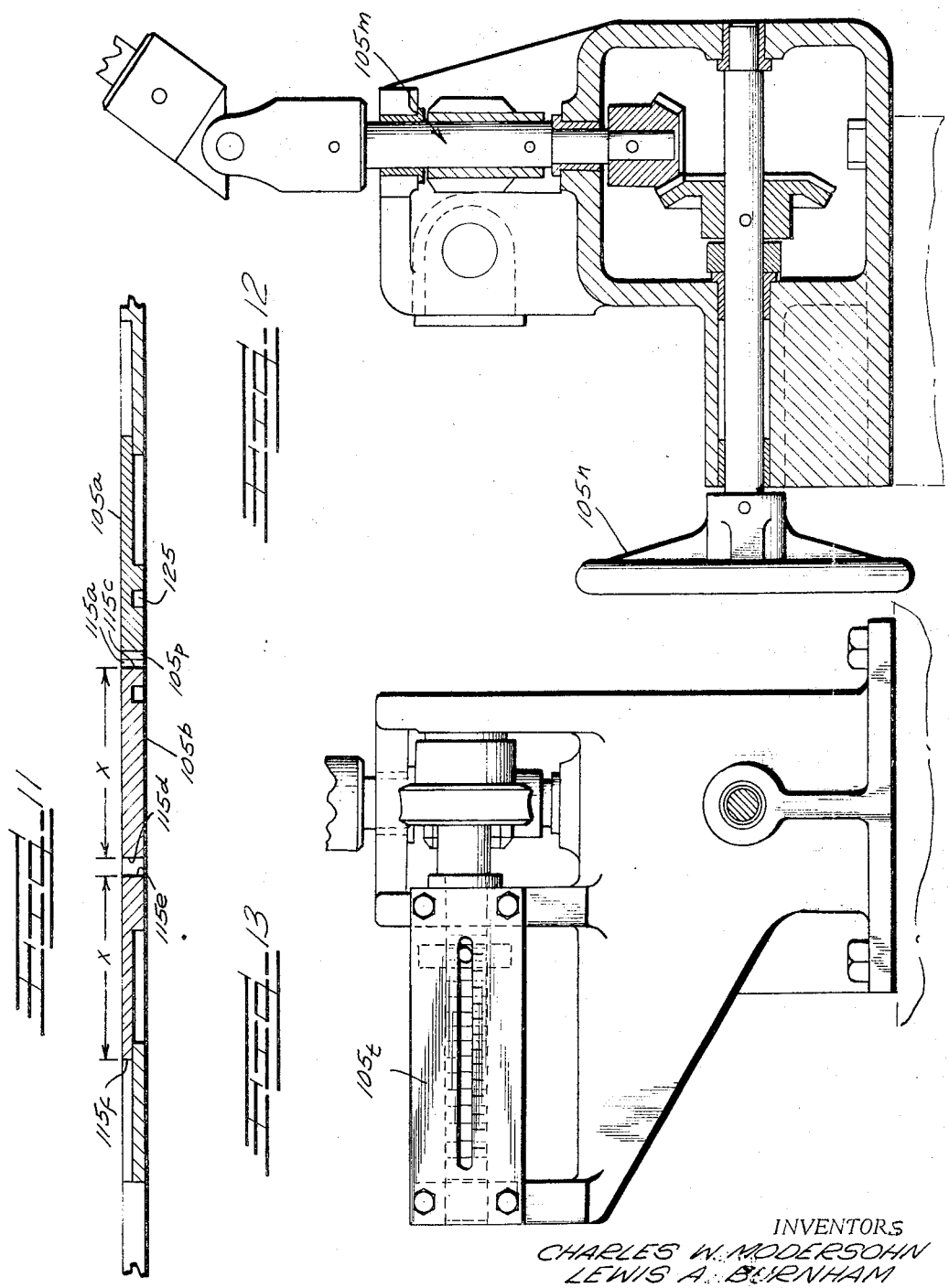

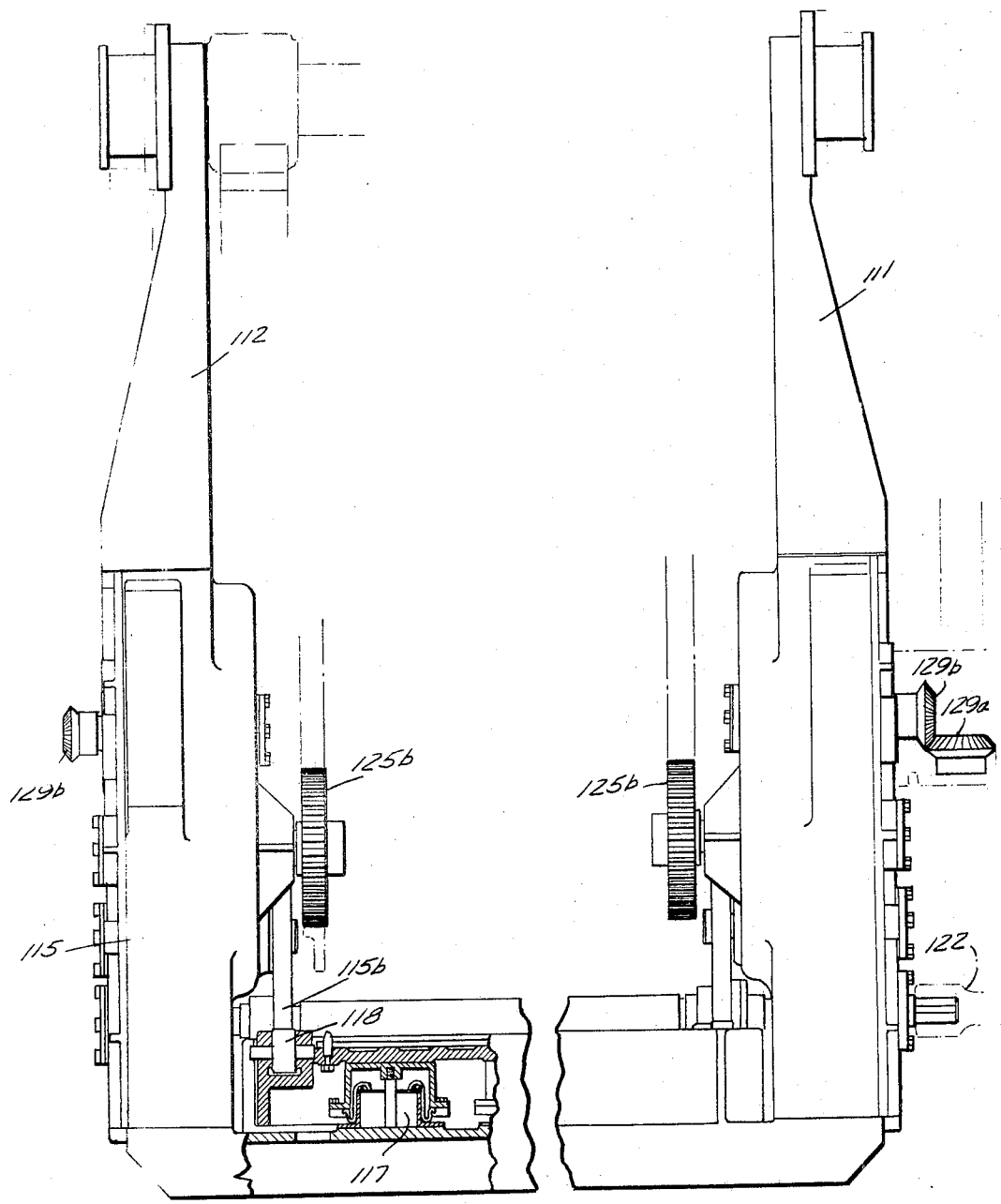

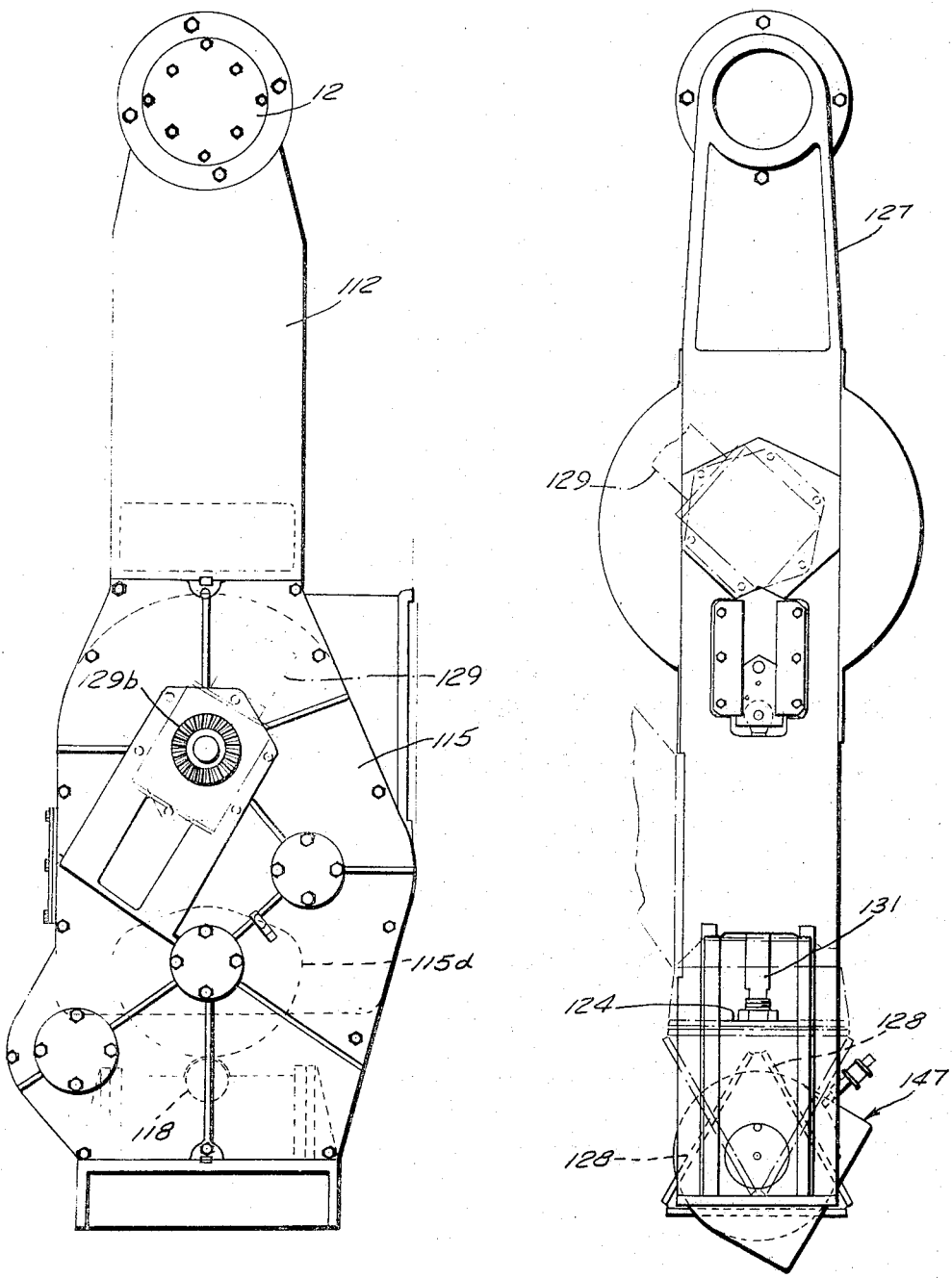

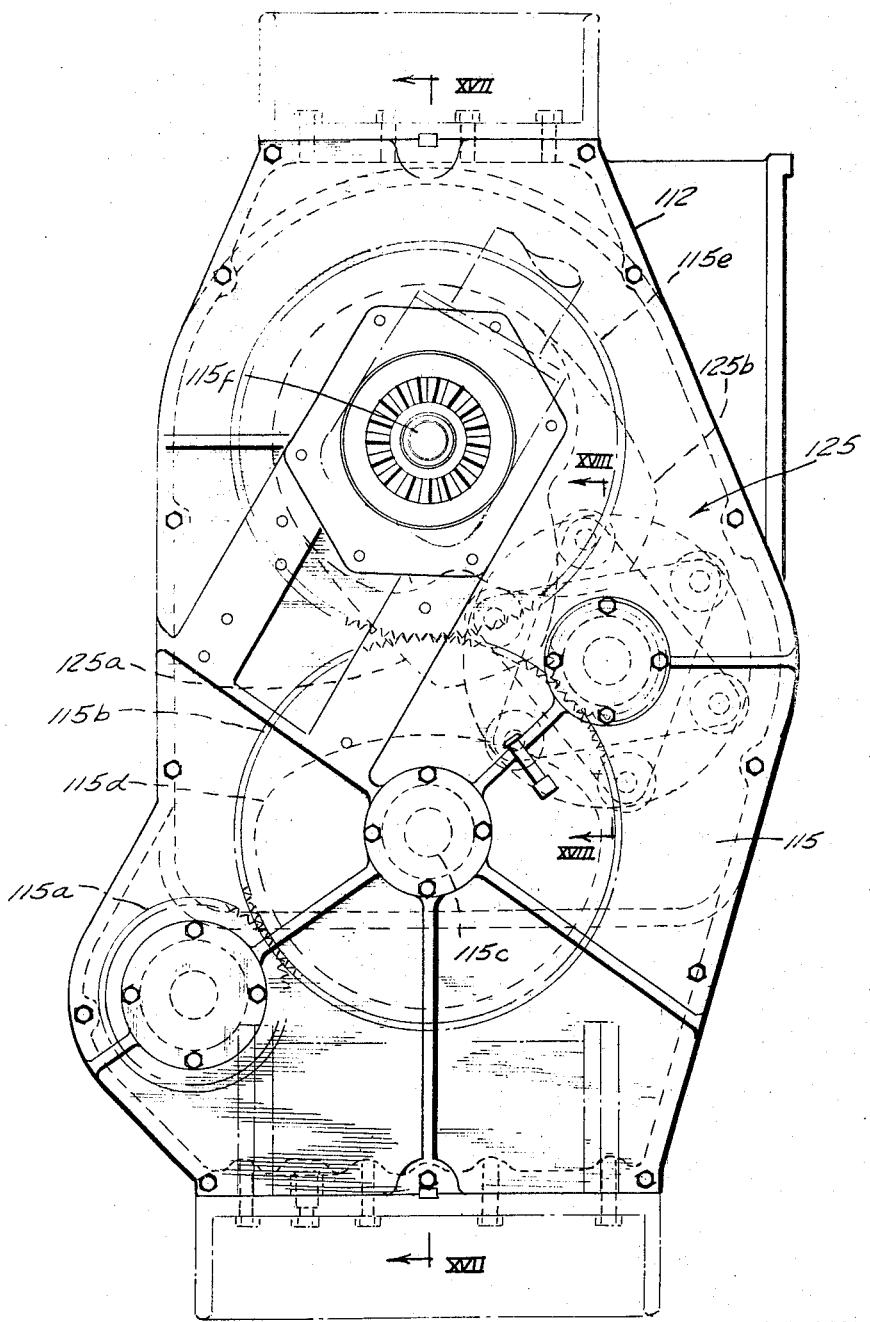

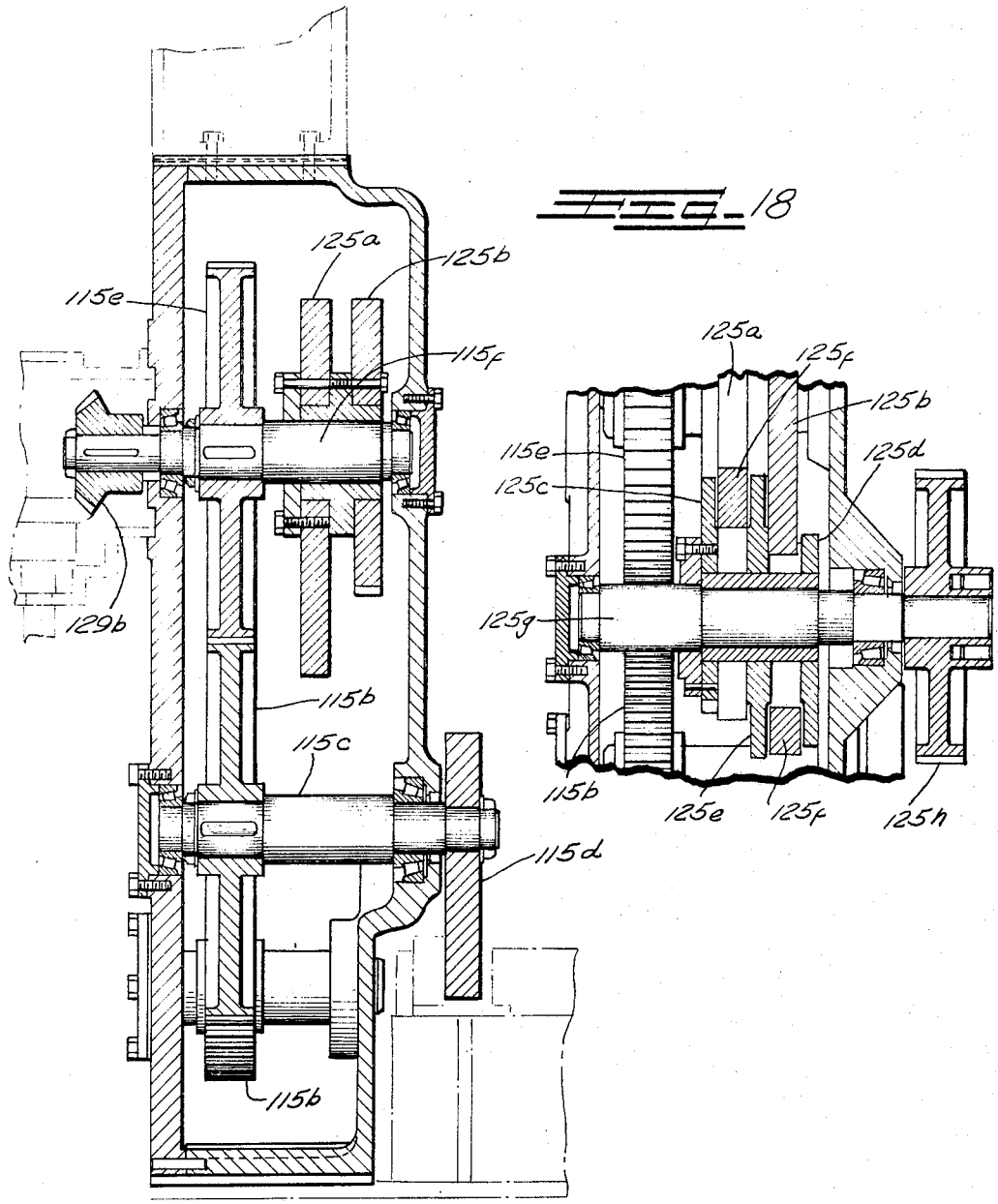

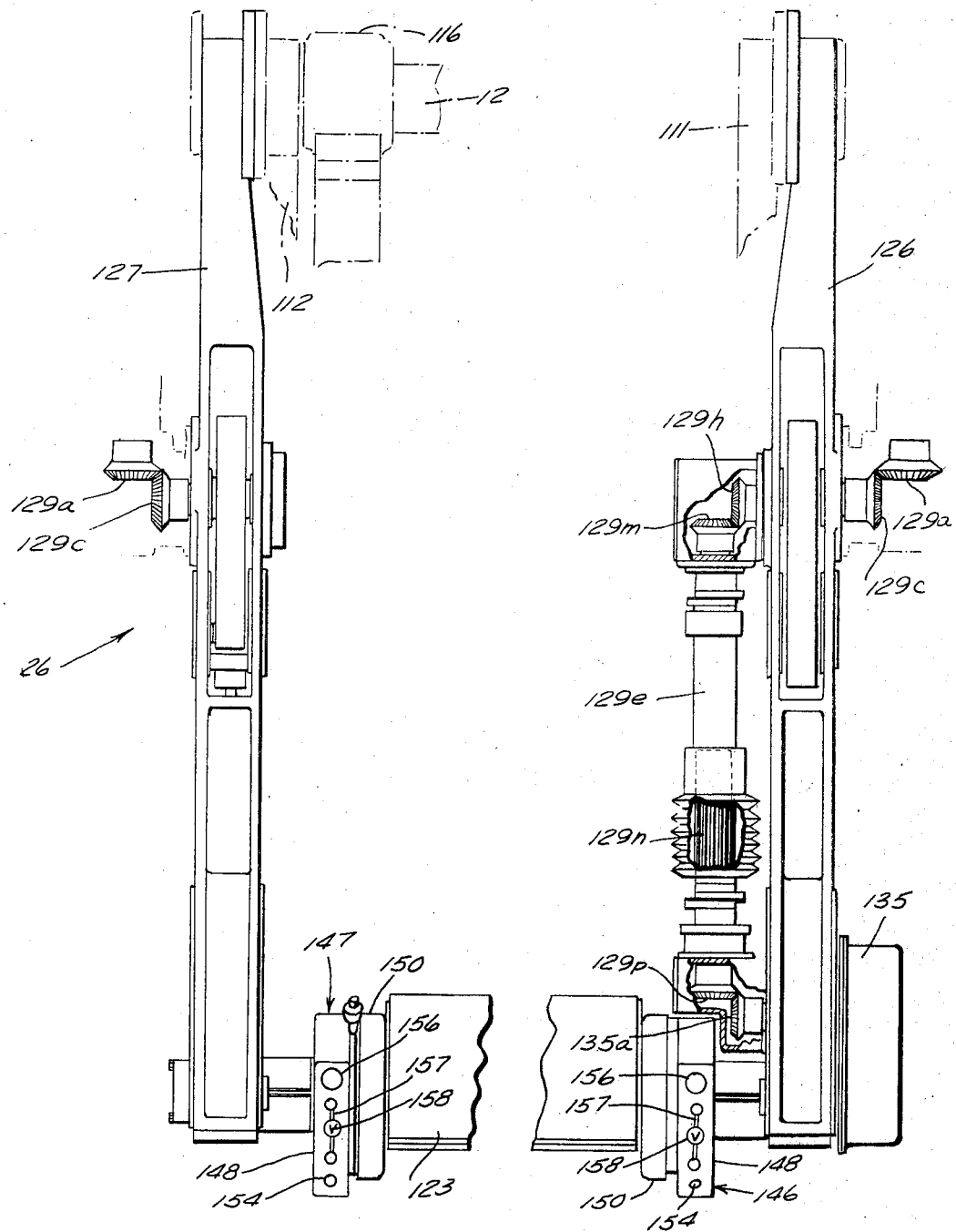

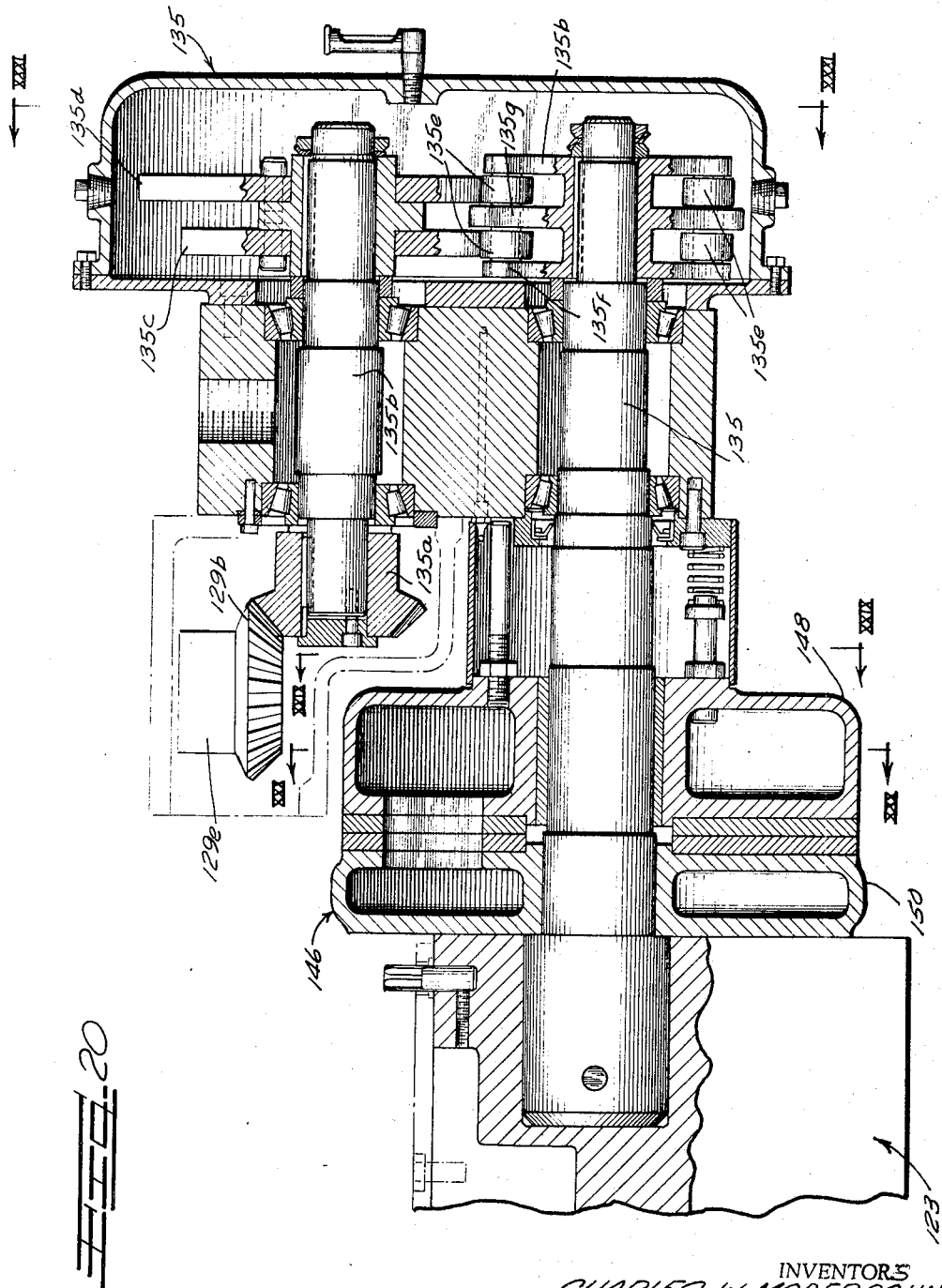

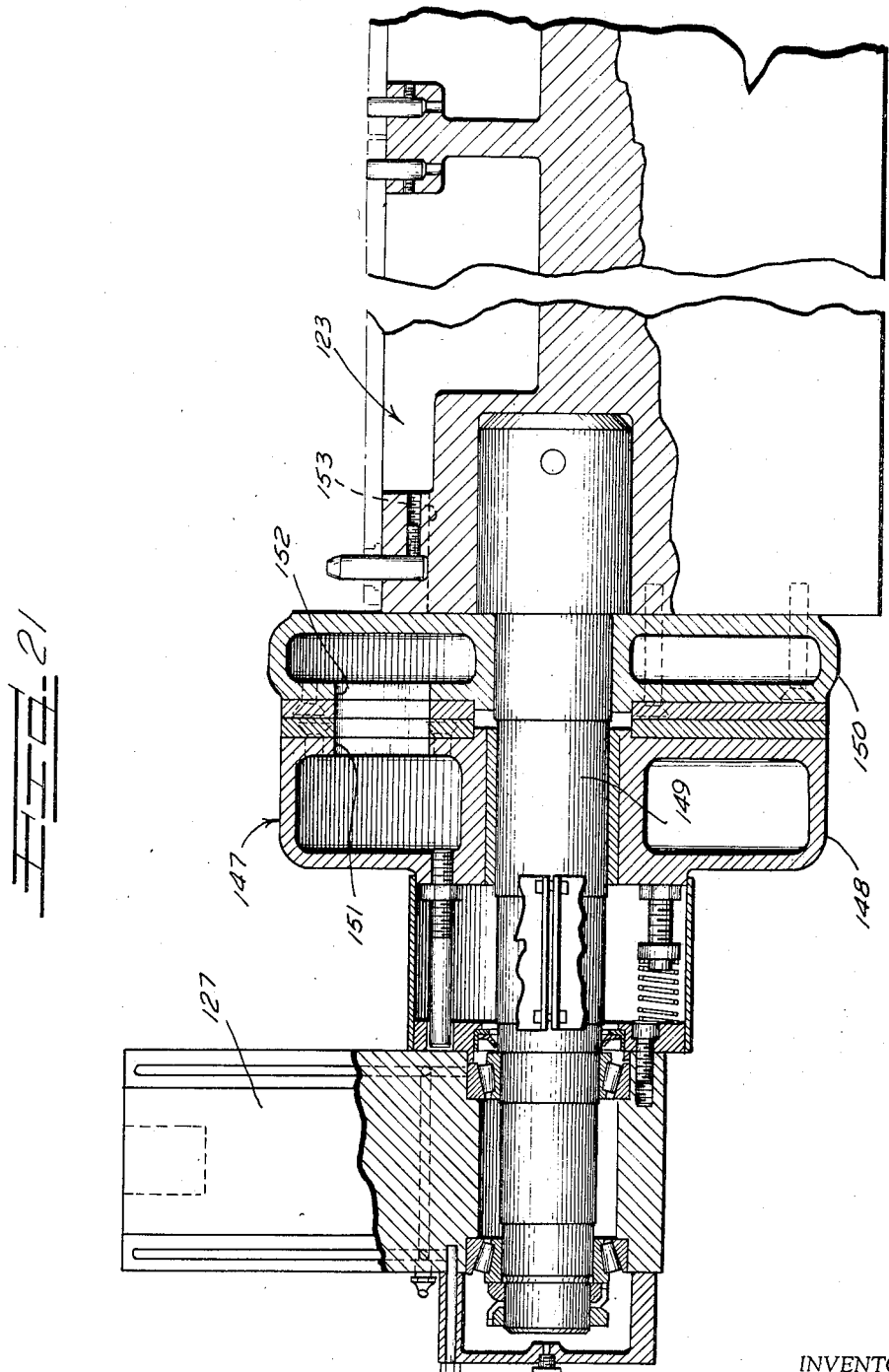

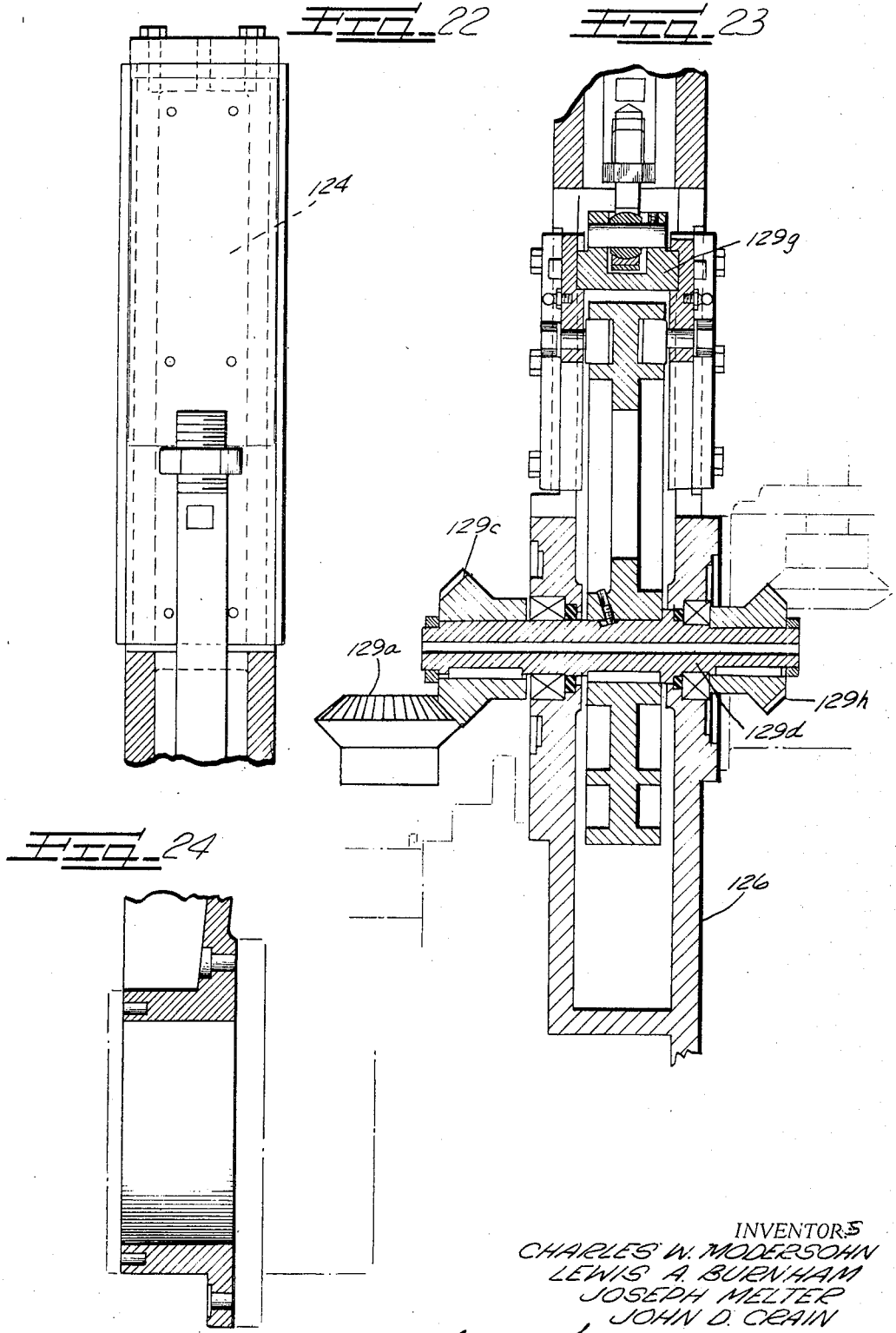

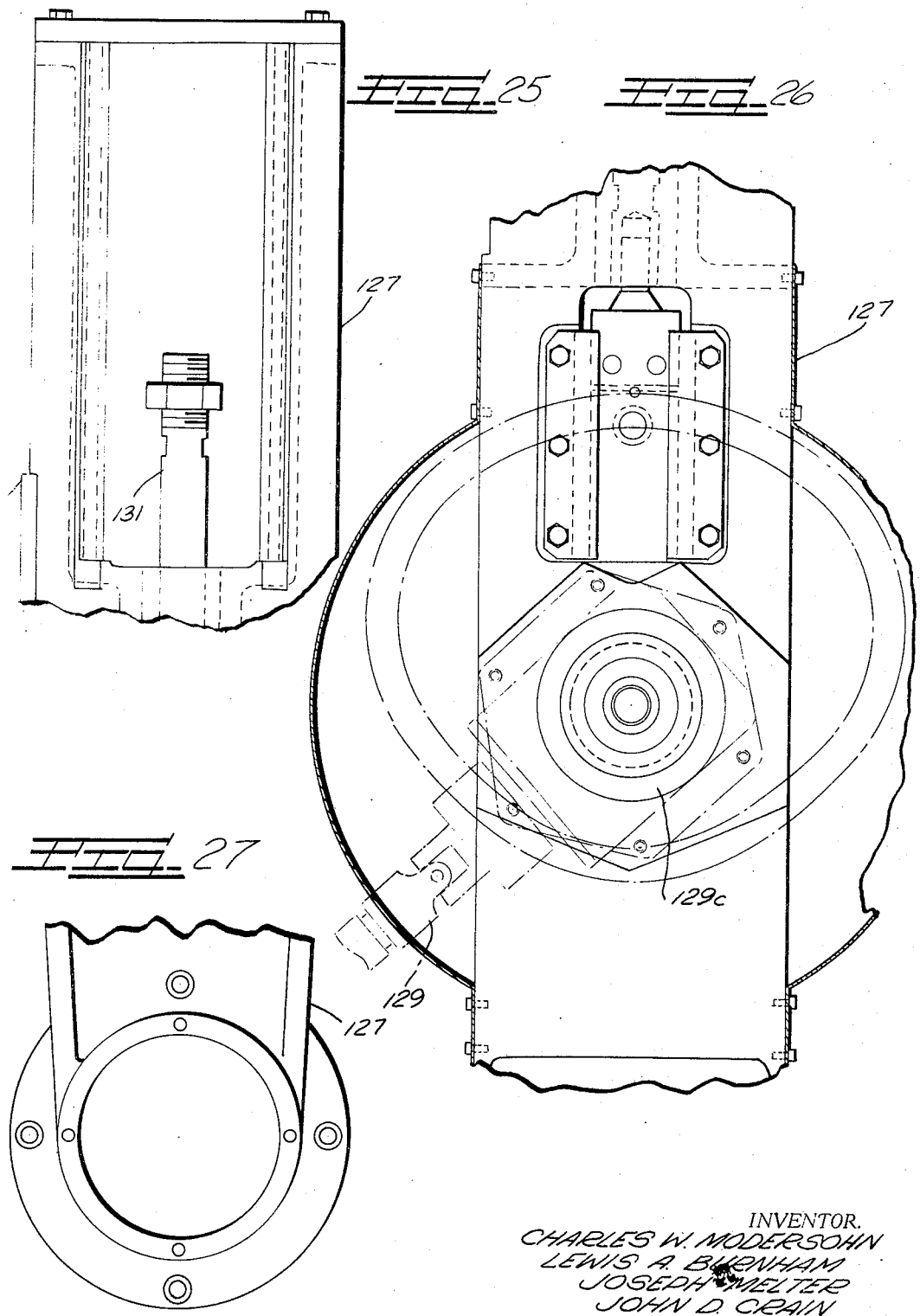

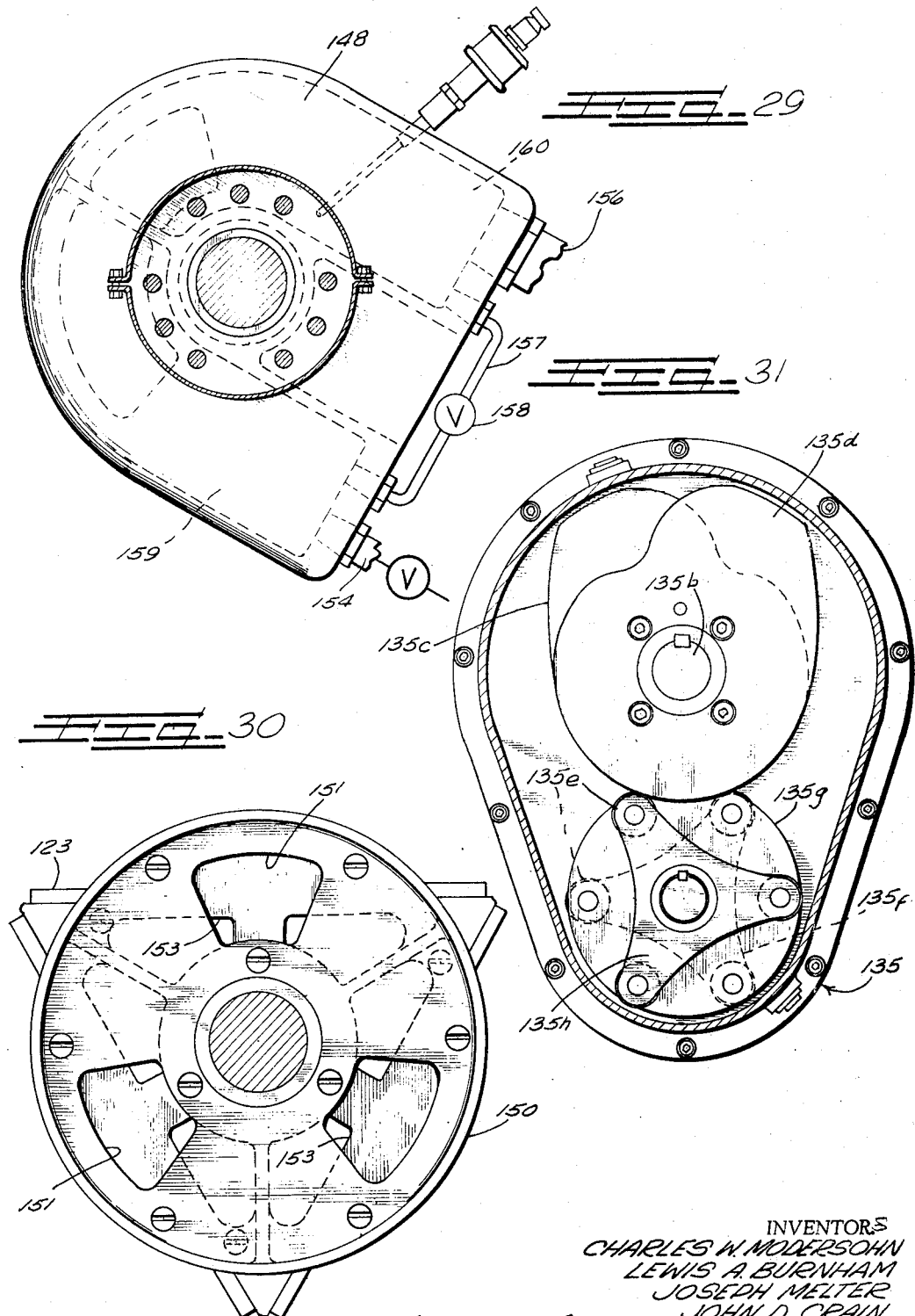

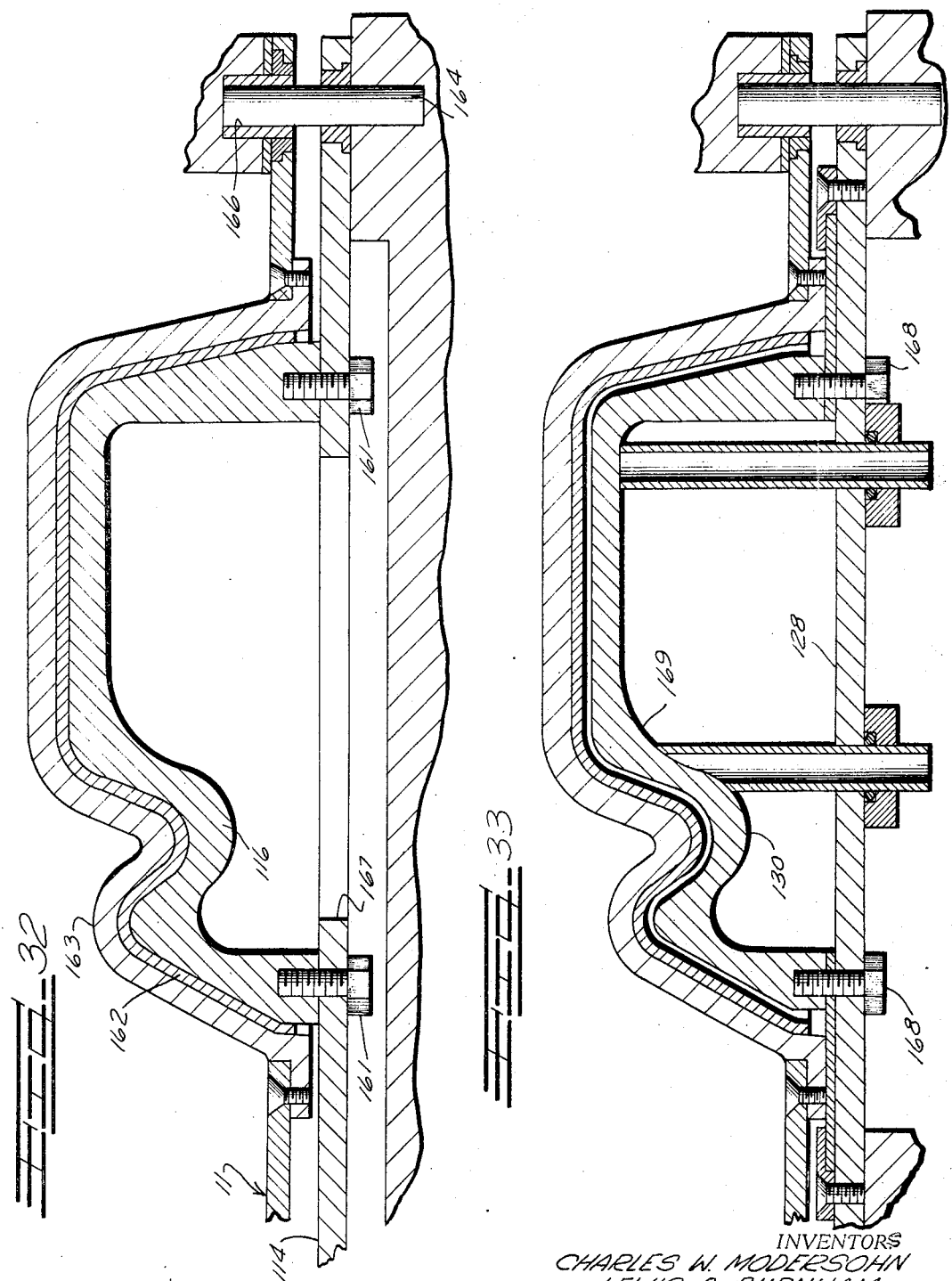

United States Patent Office

3,503,847
Patented Mar. 31, 1970

3,503,847
PULP MOLDING MACHINE
Charles W. Modersohn, Lewis A. Burnham, Joseph Melter, and John D. Crain, Beloit, Wis., assignors to Beliot Corporation, Beloit, Wis., a corporation of Wisconsin
Filed Apr. 9, 1965, Ser. No. 447,024
Int. Cl. D21j 3/00
U.S. Cl. 162—392                    2 Claims

ABSTRACT OF THE DISCLOSURE

A drum or turret is provided having a plurality of circumferentially spaced mold stations including suction boxes formed thereon at the periphery of the drum for receiving a plurality of foraminous mold members. A hollow support tube and a hollow siphon tube communicates with each suction box to a first vacuum chamber and a second vacuum chamber respectively. Vacuum control is provided for the first vacuum chamber by adjustable valve plates. Swingable arms are mounted on the shaft of the drum, extending radially beyond the periphery of the drum carrying mold pressure members and mold extraction members pivotally connected to the arms. A cam arrangement is disclosed for rocking the mold members about the pivots.

---

This invention relates generally to a molding machine and more particularly relates to a molding machine of the rotary type for molding articles from a liquid suspension of fibers such as pulp slurry or stock.

The molding machine of this invention is particularly well adapted to the formation of molded pulp articles having a variety of configurations such as egg cartons, berry cartons, plant boxes and similar items.

Briefly, the illustrated embodiment of the invention comprises a continuously rotating drum or turret having a plurality of circumferentially spaced mold stations including suction boxes formed thereon at the periphery thereof for receiving a plurality of foraminous mold members.

A forming station is situated at the lower portion of the drum and includes an open stock or pulp slurry supply pan for receiving a supply of stock. The supply pan is located in the lower portion of the path of travel of the mold members as they rotate on the periphery of the drum such that the mold members are dipped or submerged into the slurry for a predetermined arc of drum travel.

The drum includes vacuum piping for applying a vacuum to the inner surfaces of the mold members as they are submerged in the stock and includes means for selectively varying the vacuum pressure. The speed of rotation of the drum and the vertical disposition of the supply pan with respect to the drum are also adjustable to vary the time period during which the mold members are submerged in the stock. The vacuum pressure, the drum speed and the period of time during which the foraminous mold members are subjected to vacuum are all parameters determinate of the thickness of the slurry deposited on the mold members.

After the mold members are lifted from the supply pan on the ascending side of the drum, they are moved continuously and successively through a trimming station, where excess slurry is removed from the mold members, through a press station, where a complementarily shaped pressure member is pressed against the mold members to form the molded articles and to express fluid from the pulp, through a drying station, where the formed articles are dried, and then through an ejection or extraction station, where the dried articles are removed from the mold members for conveyance from the mold machine. The mold members are then carried through a mold cleaning station where they are cleaned before being moved again through the forming station.

It will be noted that the rotation of the drum, and hence the molding operation itself, is continuous. Thus, the invention is well suited to provide a high rate of production. In addition because the heavy drum is moved continuously through the various operating stations the problems attendant starting and stopping of the drum, as would obtain, for example, if the mold stations were indexed to the various stations, are avoided. The thickness of the stock deposited on the mold members in the forming station can be controlled and the temperature of the drying medium in the drying station can be correlated with the time period of the drying operation for optimum results.

The molding machine of this invention is relatively simple in design and construction, is well suited for high production rates, provides for a high degree of flexibility in thickness and shape of the molded articles and is adapted to serve a long, useful life with minimum maintenance.

It is, therefore, an object of the present invention to provide a pulp molding machine particularly well suited for high production rates.

Another object of the present invention is to provide a pulp molding machine as described including a drum which rotates continuously through a plurality of forming stations to completely form and dry molded articles in a continuous operation.

Another object of the present invention is to provide a pulp molding machine which comprises a forming station, a trimming station, a pressing station, a drying station, an extraction station and a mold cleaning station, wherein the mold members are moved successively and continuously through the stations to provide a continuous molding operation.

Still a further object of the present invention is to provide a rotary pulp molding machine for completely forming and drying molded articles and wherein the amount of stock deposited on the mold members and the temperature of the article drying medium and the duration of drying time can be correlated to accommodate the formation of articles of different wall thickness.

Another object of the invention is to provide a rotary pulp molding machine adapted to mold simultaneously articles having different mold characteristics.

Yet another object of the present invention is to provide new and improved means for trimming the mold members to remove excess stock therefrom after the stock has been deposited thereon.

Another object of the invention is to provide a pulp molding machine wherein a vacuum is applied to the mold members as they are submerged in the stock to draw the stock to the mold members and wherein the length of time during which the mold members are submerged in the stock and the pressure of the vacuum are selectively controllable to control the thickness of the stock deposited on the mold members.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

IN THE DRAWINGS

FIGURE 1 is a front elevational view of an exemplary pulp molding machine constructed in accordance with the principles of the present invention;

FIGURE 2 is a fragmentary sectional side view of the drum or turret of the pulp molding machine of FIGURE 1;

FIGURE 3 is a fragmentary side elevational view of the drum with portions thereof cut away for clarity;

FIGURES 4 and 5 are side elevational views of the piping and nozzle arrangements of the cleaning and trimming stations, respectively, of the invention;

FIGURE 6 is an elevational end view of the cleaning station of FIGURE 4 as viewed from the front end of the molding machine as seen in FIGURE 1;

FIGURE 7 is an elevational end view of the trimming station of FIGURE 5 as viewed from the back end of the molding machine;

FIGURE 8 is a diagrammatic view of the spray pattern of the trimming station of FIGURES 5 and 7;

FIGURE 9 is an enlarged front elevational view of a stock pan of the molding station of the invention;

FIGURE 10 is an enlarged fragmentary front sectional view of an adjustable regulating valve mechanism of the molding station;

FIGURE 11 is a horizontal sectional view of a valve plate arrangement of the adjustable regulating valve mechanism taken substantially along lines XI—XI of FIGURE 10;

FIGURE 12 is an elevational side view of an operating assembly of the adjustable regulating valve mechanism;

FIGURE 13 is a front elevational view of the operating assembly of FIGURE 12 with parts removed for clarity;

FIGURE 14 is a side elevational view of a press station of the invention with portions thereof broken away to show parts in section;

FIGURE 15 is a front elevational view of a swingable arm of the press station;

FIGURE 16 is an enlarged front elevational view of the radially outer end of the swingable arm shown in FIGURE 15;

FIGURE 17 is a sectional view taken substantially along lines XVII—XVII of FIGURE 16;

FIGURE 18 is a sectional view taken substantially along lines XVIII—XVIII of FIGURE 16;

FIGURE 19 is a side elevational view of an extraction station of the invention with portions thereof broken away to show parts in section;

FIGURES 20 and 21 are sectional views of end portions of carriage frame of the extraction station of FIGURE 19;

FIGURES 22–24 are fragmentary sectional views of a swingable arm member of the extraction station of FIGURE 19 as viewed from the side of the pulp molding machine of FIGURE 1;

FIGURES 25–27 are fragmentarily elevational views of the swingable arm of FIGURES 22–24 as viewed from the pulp molding machine of FIGURE 1;

FIGURE 28 is a front elevational view of the swingable arms of FIGURES 22–24;

FIGURES 29–31 are sectional views taken substantially along lines XXIX—XXIX, XXX—XXX and XXXI—XXXI, respectively, of FIGURE 20;

FIGURE 32 is an enlarged fragmentary vertical cross-sectional view of a pressure member of the press station; and FIGURE 33 is similar to FIGURE 32 but illustrates an extraction die member of the extraction station of the invention.

AS SHOWN IN THE DRAWINGS

Referring to FIGURES 1–3, an exemplary pulp molding machine constructed in accordance with the principles of the present invention is shown generally at reference numeral 10.

The machine 10 more particularly comprises a horizontally extending cylindrical drum or turret 11 carried on a shaft 12 which is rotatably mounted on a main frame 13 by means of a pair of journal boxes 14 and 16 situated respectively at the front and back ends of the machine. In the illustrated embodiment the journal boxes house anti-friction bearings of the roller type.

A plurality of circumferentially spaced mold stations 17 are formed on the periphery of the drum 11. Each of the mold stations 17 comprises a mounting or die plate 18 mounted on a suction box 19. The die plates 18 are each provided with suitable mounting means for mounting thereon a foraminous or fluid-permeable mold member (one of which is indicated schematically at reference numeral 25) and such mounting means may comprise, for example, a plurality of mounting bores 20 for receiving a plurality of mounting studs.

Articles having configurations and mold characteristics similar to egg cartons, berry trays, seed pots and the like are particularly well suited for manufacture by the machine 10. Such articles, which are generally made of pulp, can be manufactured at relatively high production rates and low costs by means of the present invention, including complete forming and drying of the articles.

The illustrated embodiment of the machine 10 comprises a total of 32 circumferentially spaced mold stations 17 although it will be understood that a greater or lesser number of mold stations can be provided. In addition it will be appreciated that the diameter and length of the drum 11 can be varied to accommodate mold stations having a greater or lesser angular width and axial depth.

As noted, each of the mold stations 17 extends substantially the axial depth of the drum 11. As best seen in FIGURE 2, each of the mold stations 17 comprises a pair of axially spaced air-tight suction boxes 19, each of which carries a mounting or die plate 20. Each of the mounting plates 20 can carry a single mold member to form a single article or a plurality of mold members to form a plurality of articles depending upon the size and configuration of the articles.

As the mold members are moved in a circular path of travel on the continuously rotating drum 11, the molded articles are formed, worked on, dried and finally removed from the machine as they move through the various operating stations.

Reference numeral 21 indicates generally a molding station situated essentially below the drum 11 and includes means for supplying a quantity of moldable material such as fibrous stock or slurry to the outer surfaces of the mold members as the members are carried therethrough.

In the view of the machine 10 shown in FIGURE 1 the direction of rotation of the drum 11 is clockwise, and situated on the ascending side of the drum (clockwise from the molding station 21) is a trimming station 22 where excess stock is removed from the mold members.

Continuing in a clockwise direction, the mold members pass through a press station 23 wherein a pressure member which is shaped complementarily to the outer surface of the mold members is aligned with and pressed against the stock deposited on the mold members for finishing the outer face of the molded article and for expressing fluid from the pulp.

After the mold members and the molded articles formed thereon leave the press station 23 they are moved into a drying station indicated generally at reference numeral 24 where the molded articles are subjected to a drying agent for removing substantially all of the moisture therefrom to complete the formation of the articles.

After the dried articles have left the drying station 24 they are moved to an ejection or extraction station 26 where they are removed from their respective mold members and transferred to any suitable conveyancing means as indicated at 27 for transfer from the machine 10. The outer surfaces of the mold members are then sprayed and flushed at a cleaning station 28 before re-entry once again into the molding station 21.

It will be appreciated that the operations that are preformed at each of the foregoing stations are undertaken while the drum rotates at a constant speed. As a result the operation of the machine is continuous and the number of molded articles which can be produced thereby over a given time interval is appreciable.

A pair of annularly shaped ring members 29 and 30 are fastened to the drum 11 at opposite ends thereof by suitable fastening means as, for example, a plurality of threaded bolts 31. The ring members 29 and 30 provide additional rigidity to the drum 11 and in order to drive the drum continuously at a constant speed a radially inwardly facing circumferentially continuous wall 32 of the ring member 30 is provided with gear teeth as at 33 to form a large ring gear which is in meshing relation with a complemental pinion gear 34 driven by a drive shaft shown diagrammatically at 36. The shaft 36 may be mounted for rotation in a journal box 37 connected in fixed assembly to a cross-frame member 38 of the main frame 13 and any suitable motive means such as, for example, a constant or variable speed electric motor 39 may be utilized in driving the shaft 36. Ring member 29 is also provided with gear teeth 33 for reasons explained hereinafter.

As best seen in FIGURES 2 and 3, each of the axially spaced suction boxes 19 in each of the mold stations 17 is generally saucer-shaped, and each comprises a pair of radially extending end walls 40 and 41, a pair of radially extending side walls 42 and 43 and an inner wall 44 which comprises a pair of sloping portions 46 and 47 and an axially extending center portion 48 which is apertured as at 49.

The end walls 40, which serve to form partition walls between adjacent suction boxes, are removably fastened to the inner walls of the suction boxes by means of threaded bolt members as at 45, and may be removed if preferable for reasons more apparent hereinafter.

As noted, the interior of each of the suction boxes 19, and therefore the inner walls of the mold members mounted on the mounting or die plates 18 thereof, are subjected to a vacuum as they are rotated from the forming station 21 to the extraction station 26 and in order to provide such vacuum a plurality of radially extending cylindrically shaped hollow spokes or support tubes 50 are connected at the radially outer ends thereof to the inner walls 44 of the suction boxes 19 and in registry with the apertures 49 thereof, and are connected in fluid communication at the radially inner ends thereof to one of a pair of annularly shaped vacuum manifolds 51 and 52. The manifolds 51 and 52 are mounted, respectively, on the shaft 12 by means of web members 53 and sleeves 54, which, in the illustrated embodiment, are formed integrally with the respective manifolds and are keyed as at 56 to the shaft 12 for corotation therewith and with the drum 11.

The tubes 50 are connected in fixed assembly to their respective manifolds 51 and 52 by means of a plurality of bolts 57.

Situated axially outboardly of the rotatable manifolds 51 and 52 are a pair of stationary vacuum manifolds 58 and 59 which are mounted on the shaft 12 for relative rotation therewith by means of web members 60 having sleeve bearing members 61 formed at the radially inner ends thereof. It will be appreciated hereinafter that whereas the first pair of manifolds 51 and 52 rotate with the drum 11, the second pair of manifolds 58 and 59 are held stationarily and in effect rotate relative to the drum 11.

Each of the rotatable manifolds 51 and 52 is provided with a pair of radially spaced partitioned vacuum chambers 62 and 63. Chambers 62 are in communication with their respective suction boxes 19 through the tubes 50, but chambers 63 are connected in fluid communication with the suction boxes through a plurality of corresponding reduced diameter conduits or siphon tubes 64, each of which has connected at the radially outer end thereof an axially extending cross-conduit 66 fitted with a plurality of radially outwardly extending reduced diameter pipes 67 which extend through the inner walls 44 of the corresponding suction box 19 to communicate with the interior of the suction box.

Formed respectively at the axially interfacing end portions of the corresponding rotatable and stationary manifolds are a pair of radially extending flanges 68 and 69. In order to provide an air seal between the corresponding valve members and to reduce friction and wear therebetween, a pair of slip joints 70, 70 are securely fastened to the respective flanges 68 of the manifolds 51 and 52 to be interposed between such flanges and the interfacing flanges 69 of the stationary manifolds 58 and 59. The slip joints 70, 70 are preferably circumferentially continuous and may be constituted of any suitable material whereby a good air-tight seal is provided between the manifolds and the friction therebetween is reduced, and in the illustrated embodiment the slip joints 70, 70 are made of material such as "cel-slip."

The slip joints 70, 70 are each provided with a plurality of generally rectangularly shaped ports 71 situated in side-by-side relation and in radial alignment, respectively, with the support tubes 50 for communicating the stationary manifolds 58 and 59 with their respective tubes 50 through the vacuum chambers 62 of the rotatable manifolds 51 and 52. In addition, the slip joints 70, 70 are provided with a plurality of generally circularly shaped ports 72 situated radially outwardly of and in alignment with the rectangular ports 71. Each of the ports 72 is additionally radially aligned with an end portion 73 of one of the siphon tubes 64 for communicating its respective stationary manifold with its corresponding siphon tube 64 through its corresponding vacuum chamber 63.

As best seen in FIGURE 1, a main vacuum header as indicated at 74 is connected in fixed assembly to the main machine frame 13 at the front end of the drum 11 and terminates at one end thereof at an outlet 76 for connection to a source of vacuum such as a vacuum pump. The cross-sectional area of the header 74 increases from an opposite end 77 back to the outlet 76 for accommodating a progressively increasing volume of air, and the header 74 is connected in turn to the stationary manifold 58 at spaced intervals circumferentially from a position adjacent the trimming station 22 clockwise to a position adjacent the entrance to the extraction station 26 by means of a plurality of spaced connectors 78, whereby the vacuum from the header 74 is communicated to the manifold 58.

Another vacuum header, shaped identically to the vacuum header 74, may be provided adjacent the opposite end of the drum 11 to function in an identical manner with respect to the outer stationary manifold 59, and such other header may be connected in parallel to the same source of vacuum to which the header 74 is connected, or in the alternative it may be connected to a separate source of vacuum.

In order to afford regulation and control of the vacuum pressure in the main vacuum header 74 a plurality of adjustable air-bleed valves 79 are spaced circumferentially therealong to enable a selectively controllable amount of air to leak into the header at predetermined intervals. In the illustrated embodiment, the air-bleed valves 79 are of the butterfly type, but it will be appreciated that other valves and valving arrangements may also be effectively utilized for this purpose.

As noted in FIGURE 2, the rotating manifolds 51 and 52 are divided interiorly thereof by means of partition walls 75 to effectively separate the vacuum chambers 62 thereof, which communicate with the support tubes 50, and the vacuum chambers 63 thereof, which communicate with the conduits or siphon tubes 64. In addition, the stationary manifolds 58 and 59 may be divided, particularly in those portions thereof adjacent the forming station 21, by means of a partition wall 80 such that various degrees of vacuum can be applied, respectively, to the support tubes 50 and to the siphon tubes 64. For this purpose, another connector 81 may be formed on each of the stationary manifolds 58 and 59 to communicate the siphon tubes 64 with a separate source of vacuum.

In this connection it will be understood that as a vacuum is applied to the suction boxes 19, and therefore to the inner surfaces of the mold members mounted thereon, a certain amount of water will be drawn from the slurry, through the fluid-permeable mold members and into the respective suction boxes. This water can be drawn from the suction boxes through the siphon tubes 64 at about the same vacuum as that applied to the support tubes 50, due to the reduced diameter of the siphon tubes with respect to the support. If desirable an increased vacuum can be applied to the siphon tubes or, in the alternative, the siphon tubes 64 can be omitted, whereupon the water will flow by gravity through the support tubes 50 to the stationary manifolds after the support tubes have rotated sufficiently upwardly on the ascending side of the drum 11.

Further, if the molding and drainage characteristics of the molded articles being formed on both of the axially spaced suction boxes 19 of each of the mold stations 17 are similar, the end walls 40 of the suction boxes can be removed to ensure equalization of the vacuums applied thereto and to permit placing a mold on the centerline of the machine to better utilize space available. On the other hand, in accordance with the principles of the invention, by maintaining the end walls 40 in place, molded articles having somewhat different molding and draining characteristics can be formed simultaneously at opposite ends of the drum 11 by applying a different degree of vacuum to each of the suction boxes 19 of a given mold station 17.

The various operating stations of the machine 10 will be described hereinafter in the order of their application in the operation of the machine and in the formation of molded articles.

FORMING STATION

Referring to FIGURES 1 and 9–13, the forming station 21 is more particularly characterized as comprising a stock pan 82 for receiving a supply of stock. The pan 82 is open at the top whereby mold members attached to the die plates 18 are dipped into and submerged in the stock as they are carried on the drum 11 through the stock pan. The stock is fed into the pan through an inlet pipe 83 and is maintained at a predetermined level with respect to the pan by means of a pair of wiers 85 and 85a situated within the pan and over which excess stock flows to be drained from the pan through a pair of outlets 84 and 86.

In accordance with the principles of the invention the stock pan 82 is supported on a plurality of adjustable jacks as at 87 and 88 which rest, in turn, on a stationary support such as a floor surface 89. The jacks 87 and 88 are selectively adjustable by means of a pair of threaded studs 87a and 88a to provide regulation of the vertical adjustment of the pan and, in turn, vertical adjustment of the level of the stock within the pan with respect to the drum 11. Indicators 87b and 88b are mounted on the jacks 87 and 88 to indicate the relative vertical positioning of the pan 82.

Thus, the angle of rotation of the drum 11 through which the mold members carried thereon are submerged in the stock, and correspondingly the length of time during which the mold members are submerged in the stock for a given drum speed, are controllable by means of the adjustable jacks. Depending upon certain parameters such as the configuration of the mold member, the consistency of the stock, the thickness of the molded article, etc., the vertical adjustment of the stock pan can be correlated so as to provide for optimum submergence time of the mold members.

The forming station 21 also includes a suction control mechanism, indicated generally at reference numeral 90, which provides means for critically controlling the vacuum applied to the mold members during the period of submergence independently of the main vacuum system as manifested by the vacuum header 74.

More particularly, the suction control mechanism 90 comprises a suction header 91 having a closed-end portion 92 extending across the lower portion of the front of the drum 11, and an open-end portion 93 for connection to a suitable vacuum such as a vacuum pump. Depending upon certain parameters including those set forth above, the vacuum applied to the header 91 may be of a higher order than the vacuum applied to the main vacuum header 74, and the level of vacuum in both the header 74 and the header 91 may preferably be, respectively, in the range of from about 0.1 to 15 inches of Hg.

A pair of take-off pipes 94 and 96 which are equipped with air bleed valves as indicated at 97 connect the header 91 to the stationary manifold 58 through an adjustable regulating valve 98, which valve effectively isolates a group of the ports 71 and 72 of the stationary manifold 58 such that the vacuum applied to the support tubes 50 and the siphon tubes 64 as their respective mold members are submerged in the stock is applied from the suction header 91 rather than the main vacuum header 74.

Referring particularly to FIGURES 10–13, the adjustable regulating valve 98 more particularly comprises radial rib members 98a–98d which, in cooperation with rib members 98c–98g, effectively isolates the lower portion of the stationary manifold 58 into a plurality of vacuum chambers 95a–95e. Chamber 95a is adapted and situated so as to be in constant communication with the siphon tubes 64 through the ports 72 as the mold members pass through the forming station, and for this reason a connector 95f in communication therewith may be connected to the same source of vacuum as connector 81 (FIGURE 2).

Chamber 95b is connected to a source of high vacuum pressure through header 94, and chamber 95c is connected to a source of medium or transitional vacuum pressure through header 96. Chamber 95d may be connected to a source of vacuum the pressure of which is substantially equal to the pressure in chamber 95e, which is connected to the support tubes 50 and the connector 78 (FIGURE 2).

Slidably movable in guideways 105c and 105d are a pair of valve plates 105a and 105b which are adjustable toward and away from each other by means of a pair of slide guides 105e and 105f slotted as at 105g to receive pins at 105h which are guided in slots 125 formed in the plates 105a and 105b. The slide guides 105e and 105f are carried in threaded relation on a stud 105k which is threaded reversely at opposite ends thereof and rotatable through a linkage 105m connected to a handwheel 105n. As the handwheel 105n is rotated in opposite directions an opening 105p between the two plates 105a and 105b increases or decreases in size, thereby determining at what angle of rotation the ports 71 connected to the support tubes 50 (FIGURES 2 and 3) will communicate with the high vacuum which exists in chamber 95b.

The distance X between end walls 115c and 115d of slots 115a and 115b of the plate 105 is equal to the distance X between end wall 115e of slot 115b and an end wall 115f of the valve plate 105b. Both distances X are equal to the width of ports 71 (FIGURE 3) so that just as the respective ports 71 are closed with respect to chamber 95b; they immediately communicate with chamber 95c, and as soon as they are closed with respect to chamber 95c they immediately communicate with chamber 95d. Ports 71 are, therefore, always in communication with the source of vacuum.

It will be appreciated that the greater the spacing between valve plates 105a and 105b, the sooner will the ports 71 communicate with the high vacuum chamber 95b, and therefore adjustment of the plates 105a and 105b, along with adjustment of the jacks 87 and 88 of the stock pan 82 effectively controls the thickness of the stock deposited on the mold members as they pass through the forming station. An adjustment indicator 105t operates similarly to the indicators 87b and 88b and is correlated therewith to co-ordinate adjustment of the height of the stock pan 82 with the adjustment of the valve plates 105a and 105b.

It will be appreciated, therefore, that as a result of the vertical adjustability of the level of stock with respect to the drum 11, which adjustment determines (along with the speed of the drum 11) the length of time during which the constantly moving mold members are submerged in the stock, and also as a result of the availability of critical control of the vacuum applied to the mold members as they are submerged in the stock as provided by the suction control mechanism 90, the thickness of the stock deposited on the outer surface of the mold members can be controlled within close limits for any stock consistency.

It will be understood that a suction control mechanism 90 may preferably be employed adjacent both ends of the drum 11 for connecting, respectively, to both stationary manifolds 58 and 59 for the purposes set forth above.

TRIMMING STATION

Referring to FIGURES 1, 5 and 7, the trimming station 22 is more particularly characterized as comprising a pair of spaced parallel spray pipes 99 and 100, extending in spaced relation along the axial length of the drum 11 radially outwardly of the die plates 18 and the mold members mounted thereon, and situated circumferentially between the forming station 21 and the press station 23. The pipes 99 and 100 are connected in parallel at one end thereof through a T connection 102 to a supply header 101 adapted for connection to a source of pressurized spray water.

Referring to FIGURES 5 and 8, a plurality of spray nozzles 103 are arranged in mutually aligned spaced relation along the spray pipe 99. As the mold members emerge from the stock pan at the forming station 21 the stock deposited thereon is first sprayed by the nozzles 103, the spray pattern of which is indicated diagrammatically in FIGURE 8 and which comprises a plurality of fans (which may desirably have an angle of divergence of from about 90° to 130° and preferably about 110°) extending at an angle with respect to a longitudinal axis 99a of the pipe 99 and overlapping one another at an angle extending transverse to the axis 99a.

A plurality of nozzles 104 are arranged along the longitudinal axis 100a of the pipe 100 to provide a spray pattern comprising a plurality of fans (the degree of divergence of which may preferably be less than that of the fans projected by the nozzles 103 and which may be in the order of from about 10° to 20° and preferably about 15°) which extend transversely to the longitudinal axis 100a.

It will be appreciated that the end view of the trimming station 22 as shown in FIGURE 7 is taken from the back end of the drum 11 looking toward the front end thereof, and as the mold members move through the trimming station the spray nozzles first spray the mold members axially from one end of the drum 11 to the other. This first spray "washes" the pulp deposited on the mold members to remove the excess stock. The mold members then pass in front of the spray nozzles 104 which are spaced to spray only between the molded articles being formed on a single die plate 18. As a result, the spray from the nozzles 104 effectively separates the several molded articles which may be formed on a single die plate. Spray water remaining on the articles will thereafter be drawn through the stock and the fluid-permeable mold members as a result of the vacuum applied to the suction boxes 19.

It will be appreciated that the various sprays as projected from the spray nozzles 103 and 104 may preferably be of the "solid" as opposed to the "hollow" type. That is, each of the fans is essentially "solid" in transverse cross-section rather than projecting a hollow spray with the spray water being projected only at the perimeters of the respective fans.

As illustrated, a saveall pan 106 is provided at the trimming station 22 for confining the spray water after it "washes" the articles, and a sump 107 is provided at the bottom of the saveall to collect the water to drain to waste through a drain line 108. Part of the water collected by the saveall 106 can be effectively utilized in mixing additional supply stock.

A pair of flexible splash guards 109 and 110 may be mounted, respectively, at the leading and trailing edges of the saveall 106 for confining the spray water within the saveall.

PRESS STATION

Referring again to FIGURES 1 and 2, the press station 23 comprises a pair of swingable arms 111 and 112 pivotally mounted on the shaft 12 outboard of the roller bearing journal boxes 14 and 16. The two arms are rigidly interconnected at the distal ends thereof by means of a press plate 113 which extends in spaced parallel relation to the mold stations 17 formed at the periphery of the drum 11. A mounting or die plate 114 extends transversely between the arms for carrying a plurality of pressure members indicated by the dashed lines at reference numeral 116 and which correspond, in number and in configuration, to the mold members carried on the drum 11.

An actuating mechanism for moving the complemental pressure members 116 alternately into and out of engagement with the pulp deposited on the mold members comprises, in the illustrated embodiment, a pneumatic air spring arrangement indicated at reference numeral 117 for biasing the pressure members 116 radially inwardly into engagement with the mold members, and a cam follower arrangement 118 for moving the pressure members 116 radially outwardly away from the mold members. A conduit 119 is connected to the air spring 117 for supplying pressurized fluid such as air thereto.

In addition, the press station 22 comprises a driving mechanism for imparting a "rocking" motion to the arms 111 and 112 in synchronism with respect to the rotation of the drum 11 whereby the arms first corotate with the drum for a given arc of drum travel while the pressure members move first into and then out of engagement with the mold members being moved adjacent thereto, then quickly pivot or "rock" backwardly in a counterclockwise direction, and then once again rotate with the drum to repeat the action. It will be appreciated that the overall arc of travel of the arms 111 and 112 while they move first in a clockwise direction with the drum 11 and then in a counterclockwise direction opposite to the direction of rotation of the drum may be somewhat greater or lesser than the circumferential center-to-center distance between the mold stations 17.

Suitable driving mechanism for driving the arms 111 and 112, for operating the cam arrangement 118 and for synchronizing the operation of the arms with respect to the rotation of the drum 11 are provided within a housing 115 of each of the arms, and such driving mechanism may be drivingly connected by a suitable linkage indicated schematically at reference numeral 122 to the drive shaft 36 connected to the prime mover 39.

Referring to FIGURES 14-18, the swingable arms 111 and 112 are substantially similar except that arm 111 only is coupled to the linkage or drive shaft 122. Each of the arms 111 and 112 comprises a drive gear 115a in the housing 115 and interconnected for corotation by means of a shaft 122a extending between the arms 111 and 112, and are connected to the shaft 122 for corotation at a constant speed.

Also mounted within the housings 115 of each of the swingable arms 111 and 112 is an idler gear 115b in mesh with gear 115a and driven at a constant speed thereby. The idler gears are mounted on rotatable shafts 115c for corotation therewith, and also mounted on each of the shafts 115c is a cam member 115d, which corotates with idler gear 115b and which engages a cam follower 118 is periodically urge the pressure members 116 (FIGURE 1) radially out of engagement with the molded articles in opposition to the air springs 117 and in synchronism with other movements of the swingable arms 111 and 112 to be discussed hereinafter.

Also situated in each of the housings 115 is another gear 115e mounted for corotation on shaft 115f and in meshing relation with idler gear 115b. A pair of cam members 125a and 125b are also mounted for corotation on shaft 115f and comprise the driving portion of a conjugate cam assembly indicated generally at reference numeral 125.

The driven portion of the cam assembly 125 comprises a pair of triangularly shaped follower plates 125c and 125d with a circularly shaped plate 125c mounted therebetween. Three rollers as at 125e are mounted between each of plates 125c and 125d and the center plate 125e at the corners of plates 125c and 125d.

The follower plates 1225c and 125d are mounted for corotation on a rotatable shaft 125g, which also carries for corotation a gear 125h mounted exteriorly of the housing 125 and in meshing engagement with gear teeth 33 of its respective ring members 29 and 30 (FIGURE 2).

As the cam members 125a and 125b are rotated on shaft 115f they periodically engage, respectively, a roller 125f to rotatably index shaft 125g and gear 125h approximately one-third revolution of the shaft 125g relative to the housing 125 and the ring members 29 and 30, thereby rotating the swingable arms 111 and 112 relative to drum 11.

The conjugate cam assemblies 125, 125 are constructed such that the swingable arms 111 and 112 will be "rocked" backwardly with respect to the drum 11 after the pressure members on the arms have moved out of engagement with the molded articles adjacent thereto. After the cam members 125a and 125b have indexed the follower plates ⅓ revolution, the cam members are effective to "lock" the follower plates 125c and 125e and the gears 125h until the next indexing operation, thereby causing the swingable arms 111 and 112 to corotate with the drum 11.

It will be understood that as a result of the engagement of the pressure members 116 with each of the mold members 25 as the mold members rotate through the press station 23 the dimensions of the outer faces of the respective articles or products formed on the mold members are established, the pulp material is compacted and the surface finish of the article is improved. Some water removal is also effected by the pressing operation.

DRYING STATION

Following the press station 23, the mold stations 17 and the molded and pressed articles formed thereon are moved through the drying station 24 wherein preferably all of the moisture is removed from the articles such that when they are removed from the machine 10 they are in a substantially or completely air-dry condition.

As shown the drying station 24 comprises a plurality of separate housing or air caps indicated at reference numeral 120 spaced radially outwardly of the periphery of the drum 11 and extending the axial length thereof.

In the illustrated embodiment the drying section 24 occupies an arc around the periphery of the drum 11 somewhat greater than 180°, and more particularly about 210°. A drying medium such as hot air is delivered to the interior of each of the air caps 120 through suitable supply means such as, for example, a plurality of conduits as indicated at 121. The drying air may be heated by means of any suitable heating apparatus such as a gas or oil fired air heater or, for example, conventional steam heating coils.

The temperature of the heating or drying medium delivered to the individual air caps 120 is regulated whereby the temperature is decreased progressively in accordance with the order in which the mold members pass under the air caps 120. For example, the temperature of the air delivered to air cap 120a, which receives the molded articles in a relatively wet condition, may be in the order of 450°. On the other hand, the temperature of the air delivered to air cap 120e, which receives the molded articles in an almost completely dry condition, may be in the order of 250–350° F.

The maximum temperatures of the air delivered to the various air caps 120 for any given mold material effectively determines (along the other parameters) the optimum speed of rotation of the drum 11, since the temperature of the drying air is a factor establishing the time required to completely dry the articles in the drying station.

As noted, the main vacuum header 74 applies a vacuum to the forming or suction boxes 19, and correspondingly to the inner surfaces of the fluid-permeable mold members mounted thereon, from the discharge side of the forming station 21 around to the ejection or extraction station 26.

As a result of this vacuum, the heated air supplied to the interior of the air caps 120 is "pulled through" the molded articles and the mold members, which produces so-called "through drying" rather than "surface drying." Surface drying causes a migration of moisture to the surface of the mold members whereas "through drying" results in progressive drying in the opposite direction, that is, from the exposed or outer surfaces of the mold members in contact with the molded article to the inner surfaces thereof.

Generally, the vacuum applied to the molded members as they are rotated from the discharge side of the forming station 21 to the first air cap 120 is maintained at a uniform level. However, as a result of the air-bleed valves 79 the vacuum applied to the mold members as they are rotated through the various air caps 120 can be effectively varied to an optimum degree, which depends upon the drying time, which in turn in a function of the speed of rotation of the drum 11, the consistency of the stock, the amount of moisture removed in the press station 23 as well as the temperature and dryness of the heating medium delivered to the air caps 120.

EXTRACTION STATION

The extraction station 26 is more particularly characterized as comprising a mounting carriage 123 extending the length of the drum 11 and situated radially outwardly thereof in spaced relation thereto. The mounting carriage 123 is rotatably mounted at the ends thereof on a pair of sliding blocks 124 which are slidably carried for reciprocal radial movement on a pair of swingable arm members 126 and 127 which are mounted for pivotal movement on the shaft 12 outboardly of the corresponding swingable arms 111 and 112 of the press station 23.

The carriage frame 123 is triangularly shaped in cross-section and each of the three sides thereof has mounted thereon an extraction die plate 128. The swingable arms 126 and 127 of the extractor station 26 are rigidly connected to the corresponding swingable arms 111 and 112 of the press station 23 by means of a pair of transfer arms as indicated at 129. As a consequence the extraction station 26 "rocks" or pivots back and forth in unison with the press station 23. In addition, power for driving the carriage frame 123 in certain predetermined reciprocating and rotating movements is transferred from the press section 23 to the extraction station 26 by means of suitable driving mechanism housed within the transfer arms 129.

The extraction die plate 128 is adapted to receive a plurality of extraction dies as indicated schematically at reference numeral 130. The extraction dies are preferably constituted of foraminous or fluid-permeable material and shaped complementarily to the press dies 116 of the press station 23. In operation the extraction station 26 moves similarly to the press station 23 with respect to the drum 11. The carriage frame 123 is rotatably indexed in 120° turns in synchronism with the rotation of the drum 11 and with the "rocking" movement of the swingable arms 111 and 112 such that the extraction dies 130 mounted on the carriage frame 123 "pick-off" the molded articles from the mold members as the respective mold members pass through the extraction station 26.

Thus, in operation the swingable arms 126 and 127 and the carriage frame 123 first rotate clockwise along with the drum 11 with an extraction die 130 indexed such as to face the molded article or articles situated on the drum 11 adjacent thereto. The interfacing extraction die is then urged into close proximity with the article by means of a pair of driving shafts as at 131 carried respectively in the swingable arms 126 and 127. A vacuum is then applied to the extraction die in order to draw the molded article off of its respective mold member and onto the die. The driving shafts 131 then reciprocally move the carriage frame 123 radially outwardly, after which the frame is rotated approximately 120° counterclockwise (as viewed in FIGURE 1), whereupon air pressure is applied to the extraction die to urge the molded article from the die to be deposited on the conveying means 27.

Another extraction die is thereupon rotated into extracting position, and the swingable arms 126 and 127 then move backwardly or counterclockwise in unison with the swingable arms 111 and 112 of the press station. The arms 126 and 127 then again move forwardly or counterclockwise to "pick-off" another molded article and to repeat the cycle.

Suitable vacuum and pressure lines 132 and 133 are connected to the carriage frame 123 for applying the necessary vacuum and pressure to the extraction dies 130 as they first remove the molded articles from the drum 11, and then discharge the articles to the conveyor 27.

Each of the transfer arms 129 is provided with a rotatable shaft having mounted for corotation at each of the ends thereof a miter gear 129a, one of which engages in meshing relation a complemental miter gear 129b mounted for corotation on shafts 115f of the swingable arms 111 and 112 and the other of which engages a complemental gear 129c mounted for corotation on a rotatable shaft 129d carried on its corresponding swingable arms 126 and 127.

Also mounted for corotation on each of the shafts 129d is a cam member 129e having a pair of continuous grooves formed therein as at 129f. A pair of cam follower members as at 129g are slidably carried in the grooves 129f and are connected to the sliding blocks 124 through a linkage mechanism 129g to impart reciprocable movement to the sliding blocks in response to rotation of the cam members 129e.

Also mounted for corotation on the shaft 129d of one of the swingable arms 126 is a second miter gear 129h which drives a rotatable shaft 129e carried on the arm 126 through a complemental gear 129m. Shaft 129e is splined as at 129m to accommodate radial movement of the carriage frame 123 and has mounted thereon for corotation therewith another miter gear 129p.

The gear 129p is a driving gear for a conjugate cam assembly 135 carried on the outer end of arm 126 for rotatably indexing the carriage frame 123 through 120° per extraction cycle.

The conjugate cam assembly 135 is more particularly characterized as comprising a miter gear 135a (FIGURES 19 and 20) mounted for corotation on a shaft 135b which also has mounted thereon for corotation therewith a pair of cam members 135c and 135d which are similar to the cam members 125a and 125b of the conjugate cam assemblies 125.

The cam members 135c and 135d are engageable with rollers as at 135e mounted on cam follower plates 135f, 135g and 135h, which are similar to the rollers and cam follower plates of the conjugate cam assemblies 125.

The cam follower plates 135f, 135g and 135h are mounted for corotation on a shaft $135_1$ on which the carriage frame 123 is corotatably mounted. It will be apparent, therefore, that the indexing of the carriage frame 123 for 120° per extraction cycle is mechanically linked to the main drive shaft 122 (FIGURES 1 and 14) through the swingable arm 111 of the press station 23.

As noted hereinabove, a negative pressure is applied to the extraction dies as they "pick-off" the molded articles from the mold members, and a positive pressure is applied to the dies to urge the articles from the dies to be deposited on the conveyor means 27 (FIGURE 1).

In order to apply such negative and positive pressures to the extractor dies of a pair of air valve assemblies indicated generally at reference numerals 146 and 147 are situated at opposite ends of the carriage frame 123.

The air valve assemblies 146 and 147 are substantially identical and each comprises a stationary manifold 148 which is connected in fixed assembly to it respective swingable arms 126 and 127 manifold 148 of the air valve assembly 146 is rotatably mounted on shaft $135_1$ and manifold 148 of the assembly 147 is rotatably mounted on shaft 149, which is similar to shaft $135_1$ with the exception of the omission of a conjugate cam assembly thereon.

In addition, each of the assemblies 146 and 147 comprises a manifold 150 which is mounted for corotation on its corresponding shaft $135_1$ or 149, and is fixedly secured to the carriage frame 123 to rotatably index therewith. Relatively movable parts as at 151, 152 and 153 are formed respectively in the manifolds 148 and 150 and the carriage frame 123 and communicate with separated chambers within the manifolds and the carriage frame to apply serially to each of the three sides of the carriage frame 123 a negative pressure as an extraction die moves into proximity with a molded article to pick it off of the drum 11, and a positive pressure after the molded article has been indexed to deposit the article on the conveyor 27 (FIGURE 1).

Suitable air connections as at 154 and 156 are mounted on the stationary manifolds 148 for connection to sources of positive and negative air pressures, respectively, and a reduced diameter conduit 157 having a bleed valve 158 mounted therein is connected to separated chambers 159 and 160 formed in the stationary manifolds 148 and communicating with the connectors 154 and 156, respectively, to minimize reduction in pressure in pressurized chamber 160 during transition from positive to negative pressure as the extractor dies are indexed.

CLEANING STATION

Referring to FIGURES 4 and 6, the cleaning station 28 comprises a plurality of spray pipes 134, 136 and 137 which extend axially radially outwardly of the drum 11 and which include respectively a plurality of spray nozzles 138 mounted thereon for spraying water over the outer surfaces of the mold members carried in the mold stations 17 for cleaning and flushing the mold members.

The spray pipes 134, 136 and 137 are connected to a water supply header 139 for connection to a pressurized supply of spray water and it will be noted that the spray pipes are enclosed by a saveall 140 which also has mounted thereon a pair of splash guards 141 and 142 situated respectively at the leading and trailing edges thereof. A sump 143 is formed at the bottom of the saveall 140 for collecting the spray water and for draining the water through a drain line 144 to waste or for utilization in the mixing of a fresh supply of stock.

PRESSURE AND EXTRACTION MEMBERS

Referring to FIGURE 32 an exemplary pressure member 116 is mounted on the mounting plate 114 of the press station 23 by means of a plurality of fasteners 161. The pressure member 116 is illustrated in engagement with a molded article as at 162 formed on a mold member 163 carried on the drum 11. A guiding pin 164 is fixedly mounted on the plate 114 and protrudes therefrom to be received in a recess 166 formed in the drum 11 to ensure alignment of the pressure member and the mold member as the two are moved together in the press station. An opening 167 is formed in the mounting plate 114 within the confines of the pressure member 116 to preclude pressure build-up within the pressure member.

Referring to FIGURE 33, an exemplary extraction die 130 is mounted on the extraction die plate 128 of the extraction station 26 by means of a plurality of fasteners 168. The extraction member or die 130 is illustrated in position to draw the molded article 162 from the mold member 163. The negative pressure utilized in drawing the article from the mold member and the positive pressure utilized in urging the article from the extraction onto the conveyor 27 (FIGURE 1) is applied to a back or inner side 169 of the extraction die 130 through a pair of tubes 170, 170 to reduce spurious movement of air into and out of the extraction die.

The pressure member 116 and the extraction die 169 may both be constituted of rigid ceramic material or, for example, sintered bronze.

OVERALL OPERATION

In operation of the mold machine 10 it is preferable to first establish the maximum temperature of the heating medium supplied to the air caps 120 consistent with the allowable temperature of the pulp mold material, such as fibrous stock which is commonly utilized in molding seed pots, egg cartons and the like articles.

After the maximum drying temperature has been established the speed of rotation of the drum 11 must then be established to correlate with such temperature, and also with such other parameters as the moisture content and thickness of the molded articles and the vacuum applied to the articles as they pass through the drying station such that a sufficient time period of travel in the drying station is provided to completely dry the articles.

After the drum speed has been established the vertical disposition of the stock pan 82 in the forming station 21 is adjusted (to establish the period of time during which the mold members are submerged in the stock), along with the level of vacuum to be applied to the mold members during the submergence period thereof, in order to provide a sufficient thickness of stock on the mold members and the desired thickness of the wall of the molded articles. The consistency of the stock is another factor determinative of the adjustment of the stock pan 82 in addition to the degree of vacuum applied to the mold members.

It will be appreciated that all of the steps necessary in the formation of a molded article are performed on a single machine, whereby the articles are formed and completely dried before being extracted from the machine. As a result, a high degree of productivity can be achieved at a relatively low cost.

Although minor modifications might be suggested by those versed in the art, it should be understood that we wish to embody within the scope of the patent warranted hereon all such modifications as reasonably come within the scope of our contribution to the art.

We claim as our invention:

1. A pulp molding machine comprising
a drum having a plurality of mold stations formed thereon,
each of said mold stations comprising at least one suction box adapted to mount a fluid-permeable mold member thereon,
a plurality of hollow support tubes in the drum and communicating respectively with each of said suction boxes,
a plurality of hollow siphon tubes in the drum and communicating respectively with each of said suction boxes,
a plurality of hollow siphon tubes in the drum and communicating respectively with each of said suction boxes, and
a vacuum manifold means on said drum and comprising a first vacuum chamber for connection to a first source of vacuum and communicating with said support tubes to apply a first vacuum to the suction boxes and the mold members mounted thereon,
a second vacuum chamber for connection to a second source of vacuum and communicating with said siphon tubes to apply a second vacuum to said suction boxes to remove water therefrom and vacuum control means for controlling the level of vacuum in said first vacuum chamber comprising a pair of valve plates, guides for said valve plates and means for adjusting said valve plates with respect to one another for adjusting the level of vacuum in said said first vacuum chamber.

2. A pulp molding machine comprising:
a drum having a plurality of circumferentially spaced mold members mounted thereon,
a shaft coaxial with said drum and supporting said drum about the drum axis,
drive means for continuously rotating said drum,
a mold forming station below said drum,
first and second pair of swingable arm means pivotally mounted on said shaft axially outboard of said drum and extending radially beyond the periphery of the drum, the individual swingable arm means of the first pair located on opposite ends of the drum and the individual swingable arm means of the second pair located on opposite ends of the drum,
rigid transfer arm means for interconnecting said first and second pairs of swingable arm means for joint pivotal movement,
mold pressure members and mold extraction members mounted for joint pivotal movement and relative radial movement respectively on said pairs of swingable arm means,
means drivingly interconnecting said drum and said first pair of swingable arm means for pivotally rocking said swingable arm means jointly back and forth in timed relation with and at a speed corresponding to the rotational speed of said drum, and
means including driving means in said transfer arm for reciprocally moving said pressure members and said mold extraction members radially with respect to and in timed relation to the rocking movement of their swingable arm means for successive steps of engagement, joint movement through an arc of travel and disengagement of said mold members and said pressure with said extraction members.

References Cited

UNITED STATES PATENTS

| | | | |
|---|---|---|---|
| 1,184,420 | 5/1916 | Chaplin | 162—392 |
| 1,883,058 | 10/1932 | Staples | 162—392 |
| 1,894,089 | 1/1933 | De Reamer | 162—392 |
| 2,234,979 | 3/1941 | Randall et al. | 162—385 X |
| 2,760,412 | 8/1956 | Lemieux | 162—392 X |
| 2,859,669 | 11/1958 | Leitzel | 162—392 |
| 3,132,991 | 5/1964 | Hornbostel et al. | 162—392 |

S. LEON BASHORE, Primary Examiner

U.S. Cl. X.R.

162—252, 275, 364